United States Patent
Metcalf-Putnam et al.

(10) Patent No.: US 10,437,863 B2
(45) Date of Patent: Oct. 8, 2019

(54) METHOD AND APPARATUS FOR HIERARCHICAL CLUSTERING OF GEOGRAPHICAL DATA

(71) Applicant: HERE Global B.V., Eindhoven (NL)

(72) Inventors: Evan Metcalf-Putnam, Cary, IL (US); Dejan Milojkovic, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 358 days.

(21) Appl. No.: 15/331,263

(22) Filed: Oct. 21, 2016

(65) Prior Publication Data
US 2018/0113880 A1 Apr. 26, 2018

(51) Int. Cl.
*G06F 16/00* (2019.01)
*G06F 16/29* (2019.01)
(Continued)

(52) U.S. Cl.
CPC .......... *G06F 16/29* (2019.01); *G01C 21/3691* (2013.01); *G06F 16/24532* (2019.01); *G06F 16/355* (2019.01)

(58) Field of Classification Search
CPC ............. G06F 17/30241; G06F 3/0481; G06F 2203/04806; G06F 3/04842;
(Continued)

(56) References Cited

U.S. PATENT DOCUMENTS 6,385,539 B1 5/2002 Wilson et al.
8,279,763 B2 10/2012 Rozum et al.
(Continued)

FOREIGN PATENT DOCUMENTS

| EP | 2 589 932 A1 | 5/2013 |
|---|---|---|
| EP | 2 730 891 A2 | 5/2014 |
| EP | 3 001 335 A1 | 3/2016 |

OTHER PUBLICATIONS

Dogru et al., "Comparison of Clustering Techniques for Traffic Accident Detection", Turkish Journal of Electrical Engineering & Computer Sciences, Aug. 12, 2013, retrieved on Aug. 30, 2016 from http://journals.tubitak.gov.tr/elektrik/issues/elk-15-23-sup.1/elk-23-sup.1-7-1304-234.pdf, pp. 2124-2137.
(Continued)

*Primary Examiner* — Yicun Wu
(74) *Attorney, Agent, or Firm* — Ditthavong & Steiner, P.C.

(57) ABSTRACT

An approach is provided for hierarchical clustering of geographical data. The approach involves receiving a request to cluster geographical data by location. The geographical area is represented by a hierarchical tile projection comprising a plurality of zoom levels, and tiles of each of the zoom levels represent different respective scales of a corresponding portion of the geographical area. The approach also involves determining that the geographical data is located in a border area of a first tile at a higher zoom level of the hierarchical tile projection. The approach further involves recursively forwarding the geographical data for clustering at a lower zoom level of the hierarchical tile projection until the geographical data is not located in a border area of a second tile at the lower zoom level. The approach then involves initiating the clustering of the geographical data into a cluster located in the second tile at the lower zoom level.

20 Claims, 19 Drawing Sheets

(51) Int. Cl.
*G01C 21/36* (2006.01)
*G06F 16/35* (2019.01)
*G06F 16/2453* (2019.01)

(58) Field of Classification Search
CPC .............. G06F 3/04883; G06F 3/0482; G06F
3/04845; G06F 17/30268; G06F 3/0485;
G06F 3/0488; G06F 17/211; G06F
17/2288; G06F 17/30265; G06F 17/3087;
G06F 17/30902; G06F 3/04817; G06F
3/147; G06F 15/173; G06F 17/30061;
G06F 17/30259; G06F 17/30271; G06F
17/30274; G06F 17/30327; G06F
17/30339; G06F 17/30424; G06F
17/3053; G06F 17/30569; G06F
17/30572; G06F 17/30994; G06F 3/0484;
G06F 3/14; G06F 7/08; G06F 7/14; G06F
8/65; G06F 17/241; G06F 17/242; G06F
17/30017; G06F 17/30244; G06F
17/30277; G06F 17/3028; G06F
17/30445; G06F 17/30575; G06F
17/30598; G06F 17/30601; G06F
17/30625; G06F 17/3071; G06F
17/30817; G06F 17/30887; G06F
17/3089; G06F 17/30958; G06F 17/5004;
G06F 1/163; G06F 1/1652; G06F 1/1694;
G06F 21/316; G06F 21/629; G06F
2203/04102; G06F 2203/04103; G06F
2203/04805; G06F 2216/13; G06F 3/011;
G06F 3/016; G06F 3/017; G06F 3/0346;
G06F 3/0412; G06F 3/0416; G06F 3/044;
G06F 3/04815; G06F 3/04847; G06F
3/0486; G06F 3/167; G06F 9/451
See application file for complete search history.

(56) References Cited

U.S. PATENT DOCUMENTS

| 8,401,771 | B2 | 3/2013 | Krumm et al. | |
|---|---|---|---|---|
| 2004/0157641 | A1* | 8/2004 | Chithambaram | G06Q 10/025 455/556.2 |
| 2005/0270299 | A1* | 12/2005 | Rasmussen | G01C 21/32 345/552 |
| 2013/0328879 | A1* | 12/2013 | Carbonneau | G01C 21/32 345/440 |
| 2013/0332057 | A1* | 12/2013 | Moore | G08G 1/0962 701/118 |
| 2014/0340419 | A1* | 11/2014 | Otero | G06T 9/00 345/619 |
| 2014/0365111 | A1 | 12/2014 | McClernon et al. | |
| 2015/0130817 | A1* | 5/2015 | Appleton | G09B 29/106 345/501 |
| 2015/0169139 | A1* | 6/2015 | Leva | G06F 3/0481 701/455 |
| 2015/0262399 | A1* | 9/2015 | Popescu | G01C 21/32 345/630 |

OTHER PUBLICATIONS

Ouyang et al., "If You See Something, Swipe towards It: Crowdsourced Event Localization using Smartphones", Proceedings of the 2013 ACM International Joint Conference on Pervasive and Ubiquitous Computing, Sep. 8, 2013, retrieved on Aug. 30, 2016 from http://synrg.csl.illinois.edu/papers/iSee_final.pdf, 10 Pages.
Office Action for corresponding European Patent Application No. 17197588.1-1231, dated Mar. 19, 2018, 15 pages.
Syed, "Parallelization of Hierarchical Density-Based Clustering using MapReduce", Jun. 15, 2015, retrieved on Mar. 26, 2018 from https://era.library.ualberta.ca/files/hm50tv43c/Syed_TalatIqbal_201502_MSc.pdf, 130 pages.
Granberg et al., "Hierarchical clustering of large volumetric datasets", Nov. 29, 2005, Proceedings of the 3rd international conference on Computer graphics and interactive techniques in Australasia and South East Asia, pp. 425-428.
Kaligirwa, "Parallel Compression and Indexing of Large-Scale Geospatial Raster Data with GPGPUs", 2017 IEEE International Congress on Big Data (BigData Congress), published Sep. 7, 2017, retrieved on Mar. 26, 2018 from https://pdfs.semanticscholar.org/1e13/a71e3d3a6f115be1535fad52c61920c08681.pdf, 122 pages.

* cited by examiner

METHOD AND APPARATUS FOR HIERARCHICAL CLUSTERING OF GEOGRAPHICAL DATA

BACKGROUND

Mapping-related service providers (e.g., map data providers, navigation service providers, etc.) face significant technical challenges when generating and updating geographical data for distribution to end users. These challenges are particularly acute in the context of real-time distribution and/or collection of geographical data (e.g., real-time traffic incident reports) to or from vehicles or other users of a transportation network. Because such geographical data or reports can be potentially numerous and their respective locations can be imprecise, service providers typically cluster the data to avoid potential duplication and/or ambiguity about a reported incident. However, performing global clustering of high volumes of dynamic geographical data can be resource constrained (e.g., with respect to computing resources, network bandwidth, etc.) to the point where real-time collection, processing, and/or distribution of the data may not feasible.

SOME EXAMPLE EMBODIMENTS

Therefore, there is a need for an approach for hierarchical clustering of geographical data to support, for instance, processing of the clustered data in a parallel or distributed computing environment.

According to one embodiment, a method for real-time clustering of geographical data in a hierarchical tile projection of mapping data comprises receiving a request to cluster the geographical data by a location of the geographical data within a geographical area. In one embodiment, the geographical area is represented by the hierarchical tile projection comprising a plurality of zoom levels, and one or more tiles of each of the plurality of zoom levels represent different respective scales of a corresponding portion of the geographical area. The method also comprises determining that the geographical data is located in a border area of a first tile at a higher zoom level of the hierarchical tile projection. The method further comprises recursively forwarding the geographical data for clustering at a lower zoom level of the hierarchical tile projection until the geographical data is not located in a border area of a second tile at the lower zoom level. The method further comprises initiating the clustering of the geographical data into a cluster located in the second tile at the lower zoom level.

According to another embodiment, an apparatus for real-time clustering of geographical data in a hierarchical tile projection of mapping data comprises at least one processor, and at least one memory including computer program code for one or more computer programs, the at least one memory and the computer program code configured to, with the at least one processor, cause, at least in part, the apparatus to receive a request to cluster the geographical data by a location of the geographical data within a geographical area. In one embodiment, the geographical area is represented by the hierarchical tile projection comprising a plurality of zoom levels, and one or more tiles of each of the plurality of zoom levels represent different respective scales of a corresponding portion of the geographical area. The apparatus is also caused to determine that the geographical data is located in a border area of a first tile at a higher zoom level of the hierarchical tile projection. The apparatus is further caused to recursively forward the geographical data for clustering at a lower zoom level of the hierarchical tile projection until the geographical data is not located in a border area of a second tile at the lower zoom level. The apparatus is further caused to initiate the clustering of the geographical data into a cluster located in the second tile at the lower zoom level.

According to another embodiment, a non-transitory computer-readable storage medium, for real-time clustering of geographical data in a hierarchical tile projection of mapping data, carries one or more sequences of one or more instructions which, when executed by one or more processors, cause, at least in part, an apparatus to receive a request to cluster the geographical data by a location of the geographical data within a geographical area. In one embodiment, the geographical area is represented by the hierarchical tile projection comprising a plurality of zoom levels, and one or more tiles of each of the plurality of zoom levels represent different respective scales of a corresponding portion of the geographical area. The apparatus is also caused to determine that the geographical data is located in a border area of a first tile at a higher zoom level of the hierarchical tile projection. The apparatus is further caused to recursively forward the geographical data for clustering at a lower zoom level of the hierarchical tile projection until the geographical data is not located in a border area of a second tile at the lower zoom level. The apparatus is further caused to initiate the clustering of the geographical data into a cluster located in the second tile at the lower zoom level.

According to another embodiment, an apparatus for real-time clustering of geographical data in a hierarchical tile projection of mapping data comprises means for receiving a request to cluster the geographical data by a location of the geographical data within a geographical area. In one embodiment, the geographical area is represented by the hierarchical tile projection comprising a plurality of zoom levels, and one or more tiles of each of the plurality of zoom levels represent different respective scales of a corresponding portion of the geographical area. The apparatus also comprises means for determining that the geographical data is located in a border area of a first tile at a higher zoom level of the hierarchical tile projection. The apparatus further comprises means for recursively forwarding the geographical data for clustering at a lower zoom level of the hierarchical tile projection until the geographical data is not located in a border area of a second tile at the lower zoom level. The apparatus further comprises means for clustering the plurality of trajectories into one or more trajectory bundles based on the similarities. The one or more trajectory bundles respectively represent a possible maneuver within the bounded geographic area. The apparatus further comprises means for initiating the clustering of the geographical data into a cluster located in the second tile at the lower zoom level.

According to another embodiment, a method for real-time clustering of geographical data in a hierarchical tile projection of mapping data comprises receiving geographical data at a first computing thread of a parallel processing system. In one embodiment, computing threads of the parallel processing system are respectively assigned to cluster data for one or more tiles of the hierarchical tile projection comprising a plurality of zoom levels, and the first computing thread is assigned to a first tile at a higher zoom level of the hierarchical tile projection. The method also comprises determining whether the geographical data is located in a border area of the first tile. The method further comprises initiating a clustering of the geographical data into a cluster in the first tile when the location is not in the border area of the first tile. The method further comprises initiating a forwarding of the geographical data to a second computing thread assigned to a second tile at a lower zoom level to perform the clustering when the location is in the border area of the first tile and not in a border area of the second tile.

According to another embodiment, an apparatus for real-time clustering of geographical data in a hierarchical tile projection of mapping data comprises at least one processor, and at least one memory including computer program code for one or more computer programs, the at least one memory and the computer program code configured to, with the at least one processor, cause, at least in part, the apparatus to receive geographical data at a first computing thread of a parallel processing system. In one embodiment, computing threads of the parallel processing system are respectively assigned to cluster data for one or more tiles of the hierarchical tile projection comprising a plurality of zoom levels, and the first computing thread is assigned to a first tile at a higher zoom level of the hierarchical tile projection. The apparatus is also caused to determine whether the geographical data is located in a border area of the first tile. The apparatus is further caused to initiate a clustering of the geographical data into a cluster in the first tile when the location is not in the border area of the first tile. The apparatus is further caused to initiate a forwarding of the geographical data to a second computing thread assigned to a second tile at a lower zoom level to perform the clustering when the location is in the border area of the first tile and not in a border area of the second tile.

According to another embodiment, a computer-readable storage medium, for real-time clustering of geographical data in a hierarchical tile projection of mapping data, carries one or more sequences of one or more instructions which, when executed by one or more processors, cause, at least in part, an apparatus to receive geographical data at a first computing thread of a parallel processing system. In one embodiment, computing threads of the parallel processing system are respectively assigned to cluster data for one or more tiles of the hierarchical tile projection comprising a plurality of zoom levels, and the first computing thread is assigned to a first tile at a higher zoom level of the hierarchical tile projection. The apparatus is also caused to determine whether the geographical data is located in a border area of the first tile. The apparatus is further caused to initiate a clustering of the geographical data into a cluster in the first tile when the location is not in the border area of the first tile. The apparatus is further caused to initiate a forwarding of the geographical data to a second computing thread assigned to a second tile at a lower zoom level to perform the clustering when the location is in the border area of the first tile and not in a border area of the second tile.

According to another embodiment, an apparatus for real-time clustering of geographical data in a hierarchical tile projection of mapping data comprises means for receiving geographical data at a first computing thread of a parallel processing system. In one embodiment, computing threads of the parallel processing system are respectively assigned to cluster data for one or more tiles of the hierarchical tile projection comprising a plurality of zoom levels, and the first computing thread is assigned to a first tile at a higher zoom level of the hierarchical tile projection. The apparatus also comprises means for determining whether the geographical data is located in a border area of the first tile. The apparatus further comprises means for comprises initiating a clustering of the geographical data into a cluster in the first tile when the location is not in the border area of the first tile. The apparatus further comprises means for comprises initiating a forwarding of the geographical data to a second computing thread assigned to a second tile at a lower zoom level to perform the clustering when the location is in the border area of the first tile and not in a border area of the second tile.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for real-time hierarchical clustering of geographical data are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
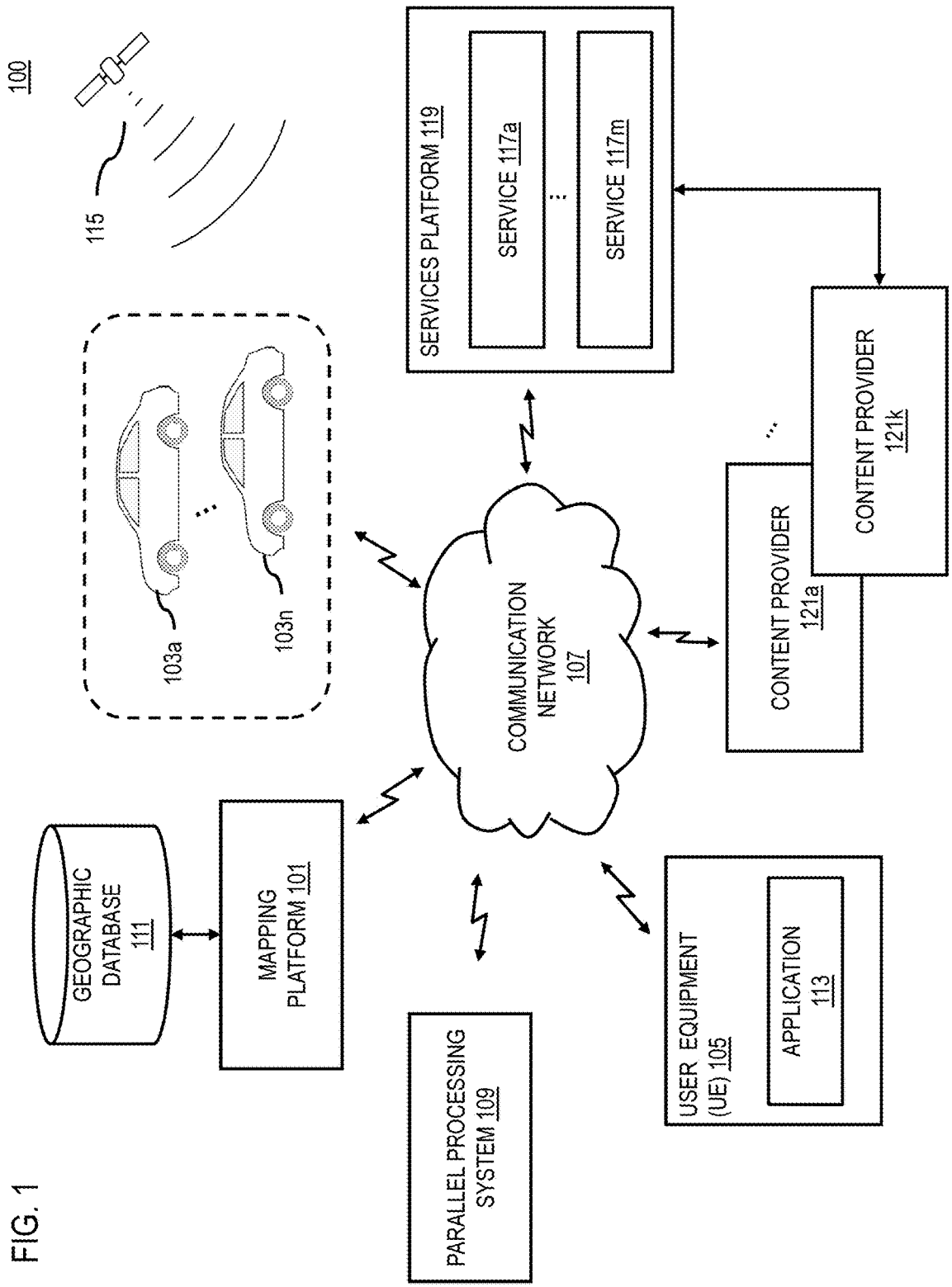
FIG. 1 is a diagram of a system capable of providing real-time hierarchical clustering of geographical data, according to one embodiment.

FIG. 1 is a diagram of a system capable of providing real-time hierarchical clustering of geographical data, according to one embodiment. As shown in FIG. 1, a system 100 includes a mapping platform 101 configured to provide, for instance, real-time or substantially real-time collection, processing, and/or distribution of geographical data (e.g., traffic incident reports, location-based events, and/or any other reports of geotagged data). In one embodiment, the mapping platform 101 is, for instance, a digital transportation infrastructure that provides for real-time delivery of information from and to connected vehicles 103a-103n (also collectively referred to as vehicles 103) and/or other connected devices (e.g., user equipment (UE) 105) over a communication network 107. In one embodiment, "real-time" and "substantially real-time" are used synonymously to indicate that events or tasks within the system 100 are performed within a specified period of time from each other (e.g., within milliseconds, seconds, minutes, and/or any other period time designated in the system 100 to represent real-time or substantially real-time). For example, real-time processing by the system 100 indicates that the geographical data received by the system 100 is processed to generate an output (e.g., a clustering of the geographical data) within the specified period of time.

In one embodiment, as part of creating this digital transportation infrastructure, the mapping platform 101 receives and delivers real-time geographical data such as data traffic incidents or other events occurring in a transportation network. Although various embodiments are discussed with respect to traffic incident data as an example of geographical data, it is contemplated other type of geographical data that includes or is tagged with location data (e.g., geographical coordinates) is applicable. Traffic incidents and/or other location-based events can be numerous, and typically are referenced to a location of a reporter (e.g., the vehicle 103 or UE 105 submitting the geographical data or from which the geographical data is collected). This can create ambiguity and confusion over where incidents are. For example, the same incident can reported multiple times and at multiple locations. In addition, traffic incidents and other similar location-based events also tend to dissipate over time, and a method for tracking the expiration of the incidents and/or the geographical data indicating the incidents is needed. Further, because of the dynamic and transient nature of traffic incidents, real-time reporting of data on such incidents generally is preferred.

To address the problem of geographical data representing multiple reports of the same location-based event or incident at multiple locations, the mapping platform 101 can perform a clustering of the geographical data to group together one or more reported geographical data points (e.g., grouped by geographical coordinates or location) representing the incident or event observations into a "cluster" and then representing the cluster as a single location point (e.g., latitude/longitude point). In one embodiment, the cluster can be associated with various metadata including, but not limited to, a unique cluster identifier (ID), a confidence value, a relevant distance, a message type, a time to live (TTL), and the like. In one embodiment, the composition and format of the metadata can form the basis of or be based on industry standards for reporting geographical data (e.g., incident reports, sensor data, telemetry, etc.) from the vehicles 103 and/or UE 105. However, methods for global clustering of geographical data generally cannot work on a real-time scale because they depend on batch processes to group large collections of geographical data or incident reports for batch processing. Because of the volume of data, such batch processing typically takes considerable computing time and resources, as well as considerable bandwidth for distribution to end user devices. The resulting computing time and resources requited by batch processing typically are too much for current traditional computing hardware to perform in real-time.

To address this additional problem, the mapping platform 101 can use a hierarchical tile projection (e.g., a standard Mercator tile projection), to segment the geographical world and the associated geographical data into tiles which represent discrete portions of the geographical world. Then different computing threads or nodes of, for instance, a parallel processing system 109 (e.g., an Apache Storm computation system, distributed node processing system, etc.) can be assigned to process or cluster geographical data associated with each respective tile. In this way, a parallel computing approach (e.g., a massively parallel approach in the case of large numbers of tiles) can be used to distribute computing loads across more computing threads or nodes to achieve real-time processing and clustering of geographical data.

For example, real-time clustering of raw geographical data (e.g., traffic incident reports) advantageously provides end users (e.g., the vehicles 103, the UE 105, etc.) with an unambiguous and uncluttered data stream identifying traffic incidents or other location-based events as they occur in real-time. In this way, for instance, end users including the vehicles 103 and/or UE 105 can better reason and make decisions about avoidance or implement other travel strategies (e.g., mitigation strategies) in response to the clustered incidents or events.

In one embodiment, the mapping platform 101 uses a hierarchical tile projection (e.g., the Mercator projection) that segments the world into, e.g., a quadtree (or any other number of subdivisions) of any depth, which each depth representing a level of the hierarchical tile projection. Generally, the depth of the projection is practically limited to 14 or less when using a typical 2 km by 2 km tile size that represents a 4 km$^2$ area because a tile at the 14$^{th}$ level would represent a 4$^{14}$ km$^2$ area (approximately 268 million km$^2$), which surpasses the total area of the world (approximately 149 million km$^2$). In one embodiment, the depth of the tile projection or tree representing the tile projection is envisioned as a "zoom level" within a map visualizer.

In one embodiment, within tiles that are at a baseline zoom level (e.g., a set maximum zoom level or a highest zoom level where each tile represents the least area or portion of the world available in the tile projection), the mapping platform 101 can apply clustering or other processing in a massively parallel fashion by sending new geographical data points to the respective computing threads of the parallel processing system 109 associated with the tiles in which the points are located. The computing threads can then cluster their respectively received geographical data points in parallel. In one embodiment, each tile can be identified by a hash or other encoding of the geographical coordinates of the area which it represents. In this way, a applying the same hash function or encoding scheme to the coordinates of the new geographical data points can determine the identifier for the tile in which the data point is located. This, in turn, enables the mapping platform 101 to determine which parallel computing thread should receive a collected geographical data point.

However, when using a tile-based parallel processing scheme for clustering of geographical data points, it quickly becomes apparent that there are literal edge and corner cases at tile boundaries where clusters should be formed but are not. This problem results, for instance, from the geographical data points being siloed to each respective computing thread. In other words, each computing thread is unable to cluster data points located because the boundaries of its respective tile because the thread would not have received the outlying data points.

Figure 2A:
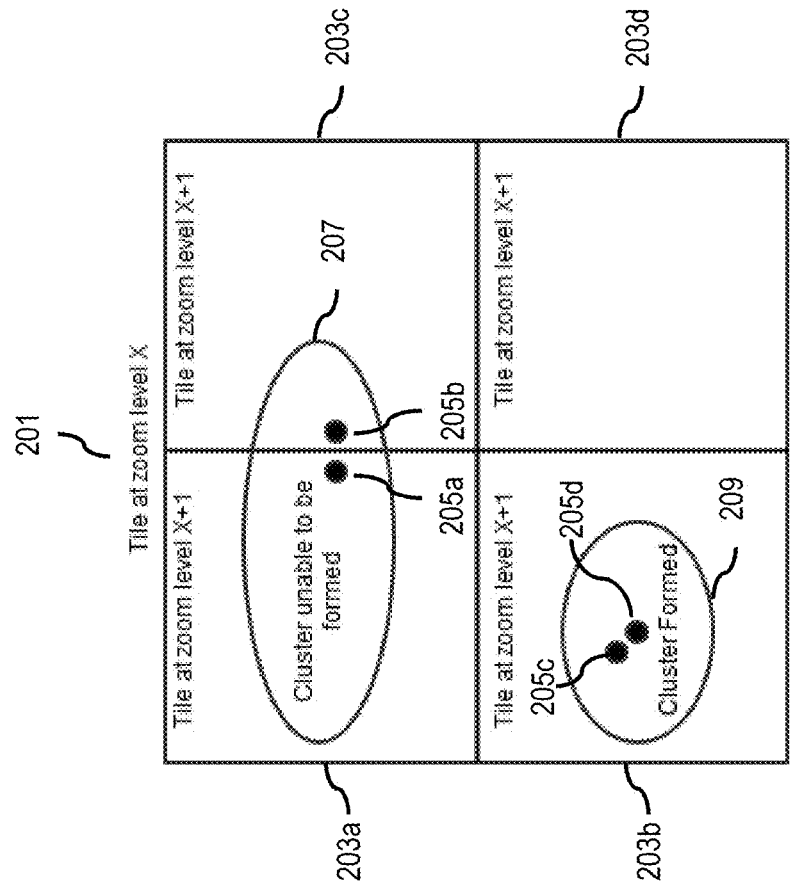
FIGS. 2A-2B are diagrams illustrating hierarchical clustering using a tile-based map projection, according to one embodiment.

For example, as shown in FIG. 2A, tile 201 which is at a lower zoom level (e.g., zoom level X) comprises tiles 203a-203d which are at a higher zoom level (e.g., zoom level X+1). In this example, respective computing threads are assigned to cluster geographical data at the higher zoom levels of the tiles 203a-203d. Keeping tiles at a higher zoom level, for instance, maximizes the number of tiles representing a geographical area, thereby, also maximizing the number of parallel computing threads to process the geographical data to more optimally distribute computing tasks across the computing threads.

As shown, geographical data point 205a is located in tile 203a, geographical data point 205b is located in tile 203c, and geographical data points 205c and 205d are located in tile 203b. Data points 205a and 205b are located close enough to each other so that they would normally form a cluster 207. However, the cluster 207 would be unable to be formed in this case because the data points 205a and 205b are located in different respective tiles 203a and 203c associated with different computing threads. Therefore, each respective computing thread of the tiles 203a and 203c would receive one of the data points 205a and 205b but not the other. Accordingly, there is no common computing thread that receives both data points 205a and 205b to create the cluster 207. In contrast, data points 205c and 205d are in located in the same tile 203b which is served by a computing thread that can cluster the two data points 205c and 205d into a cluster 209. As a result, service providers face the technical challenge of clustering geographical data points that occur at tile edges and/or corners while also maintaining as many parallel computing threads as possible to achieve real-time data clustering and distribution.

To address this problem, the system 100 of FIG. 1 introduces the capability to create a border area within each tile such that any new geographical data point that is located within the border is first clustered in the tile and then the resulting cluster is "forwarded" to a parent tile at a lower zoom level. In this way, the parent tile, which has a larger coverage than its child tiles and which is associated with its own computing thread) can cluster the forwarded cluster and the data points contained therein provided that the cluster or data points also do not fall within a border region of the parent tile. In one embodiment, the forwarding process can occur recursively until the process reaches a zoom level at the cluster or data points do not occur in a border region of a tile.

In one embodiment, the system 100 can specify the border based on any means including, but not limited to, a clustering distance applied by the system 100 to cluster the geographical data. By way of example, the clustering distance is a distance from a first point within which a second point would be clustered with the first point to create a new cluster or to join an existing cluster. In one embodiment, forwarding the cluster comprises transmitting the created cluster from a computing thread assigned to the initial tile to another computing thread that is assigned to the parent tile at the lower zoom level.

In one embodiment, the cluster is a collection of geographical data points and a single point that represents a location of the entire cluster. In one embodiment, the system 100 (e.g., via the mapping platform 101) can associate metadata with the cluster to describe parameters such as message type (e.g., indicating type of geographical data, incident, location-based event, etc.), representative location, confidence value (e.g., a value indicating that the confidence that the geographical data points in the cluster reflect a common incident or event), relevant distance (e.g., distance at which a client or user device should be notified of the cluster), time-to-live (e.g., time at which the cluster should be removed from the system), unique cluster identifier (ID), and/or the like.

In one embodiment, when a cluster is forwarded to a parent tile, the cluster at the initial or child tile is permanently flagged so that any future geographical data points that are added to the cluster are also forwarded to a parent tile, even if the original geographical data point(s) that were in the border region expire or are removed from the cluster. As noted above, this process can be iterated from higher zoom levels to progressively lower zoom levels of the tile projection until there is an unambiguous clustering solution (e.g., a cluster wholly contained in a tile with no data points in the border region of the tile). For example, at the lowest possible zoom level (e.g., $14^{th}$ zoom level as described above), a single tile can represent the entire world and the distance calculations for clustering are able to handle the wrap-around from the left side of the tile to the right side of the tile. Therefore, at this zoom level no additional forwarding is needed.

In one embodiment, expiration of each respective geographical data point and/or cluster can also be processed and forwarded from higher zoom levels to lower zoom levels in the same manner as new points. For example, removal of expired data points and/or clusters can be processed at the highest possible zoom level and then forwarded to parent tiles. In one embodiment, the forward occurs, e.g., when the expired data points would be clustered in a cluster flagged as having been forwarded, or when the expired data points or cluster is otherwise located in the border region of a tile. By starting from the highest zoom level and progressing to lower zoom levels, the system 100 can advantageously avoid potential race conditions in which multiple processes can potentially produce unexpected results when operating on the same data.

Figure 2B:
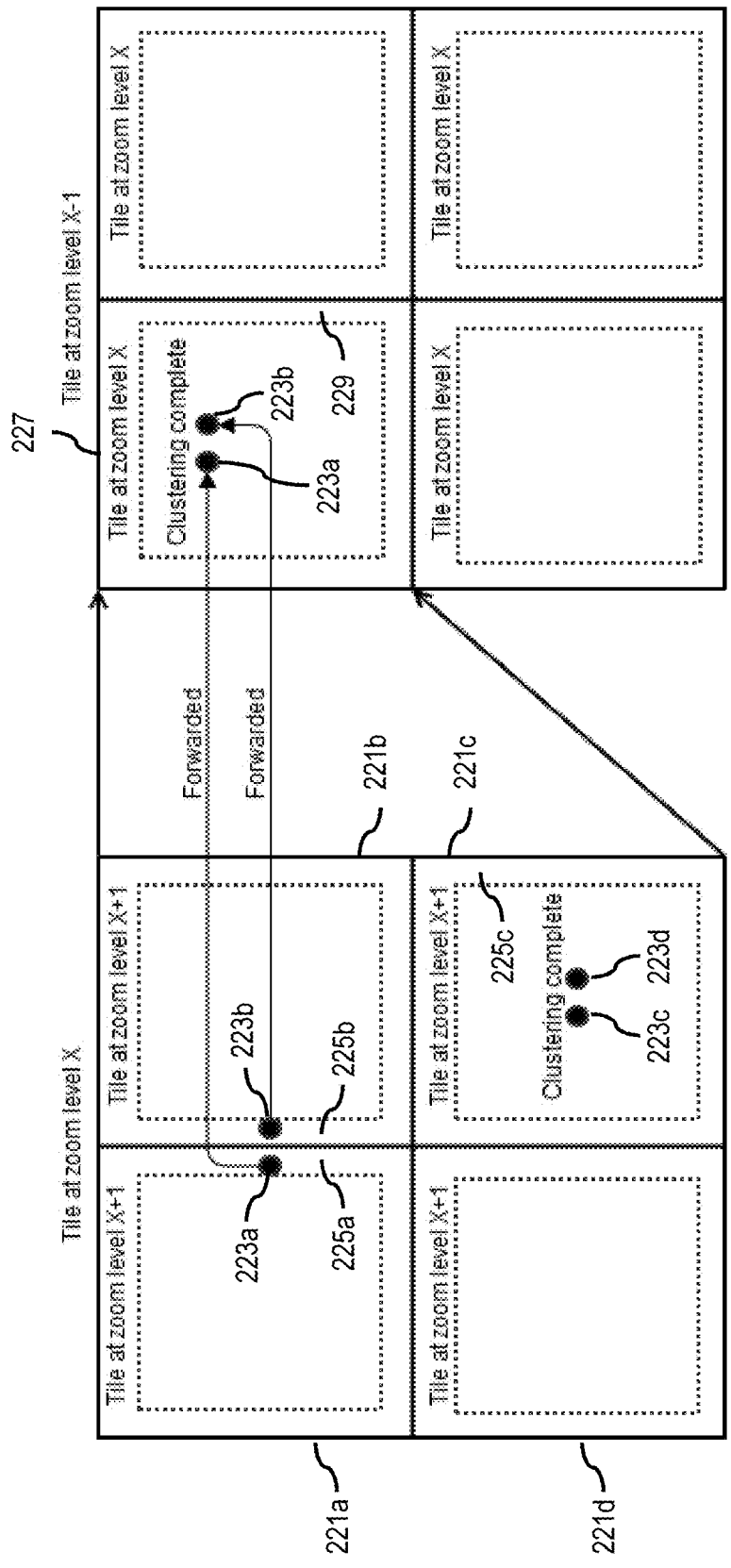

FIG. 2B illustrates an example of the embodiments of hierarchical clustering described herein. In the example of FIG. 2B, tiles 221a-221d are presented at a higher zoom level (e.g., zoom level X) of a tile projection. A data point 223a is received at a computing thread associated with tile 221a. The system 100 determines that the data point 223a is located in a border region 225a of the tile 221a. Based on this determination, the system 100 initiates a clustering of the data point 223a into a cluster at the tile 221a. The cluster containing the data point 223a is forwarded from tile 221a to the parent tile 227 at a lower zoom level (e.g., zoom level X−1). Concurrently, the cluster containing data point 223a is maintained at the tile 221a and flagged as having been forwarded to the parent tile 227. Similarly, the tile 221b includes a data point 223b located in a border region 225b of the tile 221b. The data point 223b is clustered into a cluster at tile 221b, and the cluster containing data point 223b is also forwarded to the parent tile 227. The cluster containing data point 223b is also maintained at the tile 221b and flagged has having been forwarded to the parent tile 227.

Based on this forwarding, the computing thread of the parent tile 227 now has a cluster containing the data point 223a and another cluster containing data point 223b. Because these data points 223a and 223b are not in a border region 229 of the tile 227, the computing thread need not forward the clusters its further parent tile at an even lower zoom level. Accordingly, the computing thread of the parent tile 227 can perform a clustering to merge the cluster containing the data point 223a and the cluster containing data point 223b into a single cluster.

The example of FIG. 2B also illustrates the tile 221c containing data points 223c and 223d. In this case, the data points 223c and 223d are not located in the border region 225c of the tile 221c. Accordingly, the computing thread associated with the tile 221c can complete the clustering of the data points 223c and 223d without having to forward them to the parent tile 227. In this way, the system 100 advantageously avoids unnecessary forwarding and computing resource usage at the parent tile 227, by forwarding only those data points and/or clusters to lower zoom levels that may potentially result in clusters that would span tile boundaries at higher zoom levels.

Returning to FIG. 1, in one embodiment, the vehicles 103 and UE 105 of system 100 are part of the digital transportation infrastructure provided by the mapping platform 101. In other words, as previously described, the vehicles 103 and/or UE 105 are part of geographical data collection system that transmits or otherwise collects geographical data (e.g., incident reports, event reports, etc.) for processing by the mapping platform 101. To provide for real-time clustering of the received geographical data, the mapping platform 101 includes or has connectivity to the parallel processing system 109. The parallel processing system 109 can achieve massively parallel processing of the geographical data by assigning different computing threads to cluster individual buckets of geographical data segmented according to their respective locations within a hierarchical tile projection representing a geographical area (e.g., representing the entire world or some portion thereof, e.g., one region, country, state, province, city, etc.).

In one embodiment, the parallel processing system 109 is a distributed node computing system comprising groups of networked computers, in which each networked computer is capable of supporting multiple processors and/or computing threads that can run concurrently in parallel. In one embodiment, the parallel processing system 109 employs a distributed real-time computation system employing an Apache Storm or similar computing topology. Such a computing topology is, for instance, capable of processing unbounded streams of geographical data, such as the data streams received from the vehicles 103 and/or UE 105 of the system 100. Additional description of the using an Apache Storm-based system is provided in FIG. 8 and related discussion below.

In one embodiment, the parallel processing system 109 need not be a distributed system comprising multiple computing devices. Instead, the parallel processing system 109 can be any computer (e.g., stationary or mobile, such as the UE 105) that provides multiple computing threads and/or processors capable of parallel processing to cluster the geographical data as described herein.

In one embodiment, the mapping platform 101 has connectivity or access to a geographic database 111 that includes mapping data about a road network, including a tile projection of the mapping data (additional description of the geographic database 111 is provided below with respect to FIG. 3). In one embodiment, the clustered geographical data can also be stored in the geographic database 111 by the mapping platform 101 for distribution to end users. In addition or alternatively, the geographical data and/or resulting clusters can be stored by another component of the system 100 in the geographic database 111 for subsequent retrieval and processing by the mapping platform 101.

In one embodiment, the vehicles 103 and/or UEs 105 may execute a software application 113 to present or use the clustering results generated by the mapping platform 101. For example, if the application 113 is a navigation application then the mapping platform 101 can transmit or publish clustered traffic incident data to the application 113 in real time to provide better situational awareness when traveling in a road network. In one embodiment, the vehicles 103 receiving the real-time clustered geographical data can be autonomous or highly assisted driving vehicles which can use the real-time incident or event reports for calculating autonomous driving behavior or control of the vehicles 103. For example, the clustered geographical data can be used to determine routing information, provide updated estimated times of arrival (ETAs), provide notifications of potentially problematic areas, and the like.

By way of example, the UE 105 is any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the UE 105 can support any type of interface to the user (such as "wearable" circuitry, etc.). In one embodiment, the UE 105 may be associated with a vehicle 103 (e.g., cars), a component part of the vehicle 103, a mobile device (e.g., phone), and/or a combination of thereof. Similarly, the vehicle 103 may include computing components that can be perform all or a portion of the functions of the UE 105.

By way of example, the application 113 may be any type of application that is executable at the vehicle 103 and/or the UE 105, such as mapping application, location-based service applications, navigation applications, content provisioning services, camera/imaging application, media player applications, social networking applications, calendar applications, and the like. In one embodiment, the application 113 may act as a client for the mapping platform 101 and perform one or more functions of the mapping platform 101 alone or in combination with the platform 101.

In one embodiment, the vehicles 103 and/or the UEs 105 are configured with various sensors for generating or collecting the geographical data. In this case, the geographical data represents sensor data associated with a geographical location or coordinates at which the sensor data was collected. By way of example, the sensors may include a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture road sign information, images of road obstructions, etc. for analysis), an audio recorder for gathering audio data, velocity sensors mounted on steering wheels of the vehicles, switch sensors for determining whether one or more vehicle switches are engaged, and the like.

Other examples of sensors of the vehicles 103 and/or UE 105 may include light sensors, orientation sensors augmented with height sensors and acceleration sensor (e.g., an accelerometer can measure acceleration and can be used to determine orientation of the vehicle), tilt sensors to detect the degree of incline or decline of the vehicle along a path of travel, moisture sensors, pressure sensors, etc. In a further example embodiment, sensors about the perimeter of the vehicle may detect the relative distance of the vehicle from lane or roadways, the presence of other vehicles, pedestrians, traffic lights, potholes and any other objects, or a combination thereof. In one scenario, the sensors may detect weather data, traffic information, or a combination thereof. In one example embodiment, the vehicles 103 and/or UE 105 may include GPS receivers to obtain geographic coordinates from satellites 115 for determining current location and time associated with the vehicle 103 and/or UE 105 for generating probe data. Further, the location can be determined by a triangulation system such as A-GPS, Cell of Origin, or other location extrapolation technologies. In yet another embodiment, the sensors can determine the status of various control elements of the car, such as activation of wipers, use of a brake pedal, use of an acceleration pedal, angle of the steering wheel, activation of hazard lights, activation of head lights, etc.

The communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In one embodiment, the mapping platform 101 may be a platform with multiple interconnected components. The mapping platform 101 may include multiple servers, intelligent networking devices, computing devices, components and corresponding software for providing trajectory bundles for map data analysis. In addition, it is noted that the mapping platform 101 may be a separate entity of the system 100, a part of the one or more services 117a-117m (collectively referred to as services 117) of the services platform 119, or included within the vehicle 103 and/or the UE 105.

The services platform 119 may include any type of service 117 configured to provide geographical data or used geographical data clustered or provided by the mapping platform 101. By way of example, the services 117 may be third party services and include mapping services, navigation services, travel planning services, notification services, social networking services, content (e.g., audio, video, images, etc.) provisioning services, application services, storage services, contextual information determination services, location based services, information based services (e.g., weather, news, etc.), etc. In one embodiment, the services platform 119 may interact with the mapping platform 101, vehicles 103, and/or UE 105 to provide the services 117.

In one embodiment, content providers 121a-121k (collectively referred to as content providers 121) may provide content or data (e.g., including geographical data) to the vehicles 103 and/or UE 105, the mapping platform 101, and/or the services 117. The content provided may be any type of content, such as textual content, audio content, video content, image content, etc. In one embodiment, the content providers 121 may provide content that may aid in the detecting and classifying of traffic incidents and/or other location-based events indicated the geographical data received by the mapping platform 101. In one embodiment, the content providers 121 may also store content associated with the vehicles 103, the UE 105, the mapping platform 101, and/or the services 117. In another embodiment, the content providers 121 may manage access to a central repository of data, and offer a consistent, standard interface to data, such as a repository of probe data, speed limit for one or more road links, speed information for at least one vehicle, traffic jam threshold for at least one road link, other traffic information, etc. Any known or still developing methods, techniques or processes for retrieving and/or accessing features for road links from one or more sources may be employed by the mapping platform 101.

By way of example, the mapping platform 101, vehicles 103, UE 105, the services platform 119, and the content providers 121 communicate with each other and other components of the system 100 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 3:
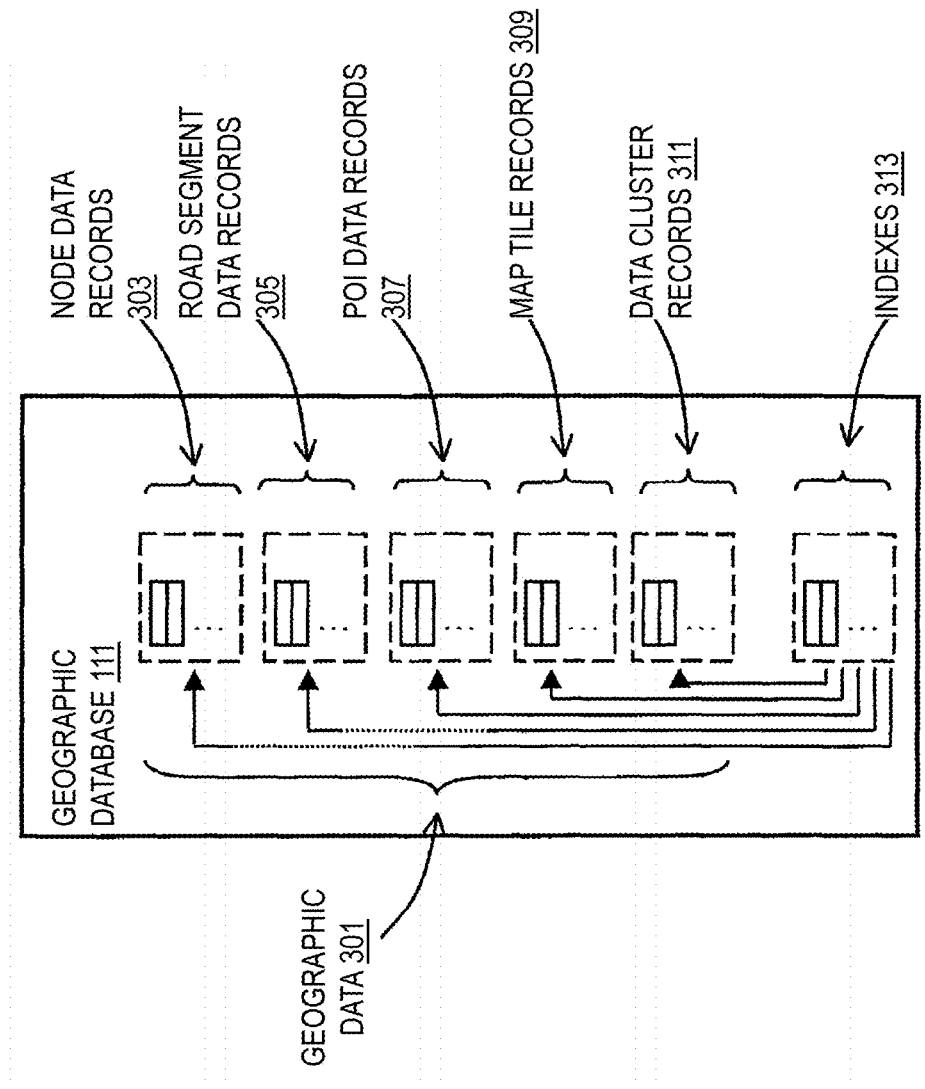
FIG. 3 is a diagram of a geographic database, according to one embodiment.

FIG. 3 is a diagram of the geographic database 111 of system 100, according to exemplary embodiments. In the exemplary embodiments, clustered geographical data can be stored, associated with, and/or linked to the geographic database 111 or data thereof. In one embodiment, the geographic database 111 includes geographic data 301 used for (or configured to be compiled to be used for) mapping and/or navigation-related services, such as for personalized route determination, according to exemplary embodiments. For example, the geographic database 111 includes node data records 303, road segment or link data records 305, POI data records 307, map tile records 309, data cluster records 311, and indexes 313, for example. More, fewer or different data records can be provided. In one embodiment, additional data records (not shown) can include cartographic ("carto") data records, routing data, and maneuver data. In one embodiment, the indexes 313 may improve the speed of data retrieval operations in the geographic database 111. The indexes 313 may be used to quickly locate data without having to search every row in the geographic database 111 every time it is accessed.

In exemplary embodiments, the road segment data records 305 are links or segments representing roads, streets, or paths, as can be used in the calculated route or recorded route information for determination of one or more personalized routes, according to exemplary embodiments. The node data records 303 are end points corresponding to the respective links or segments of the road segment data records 305. The road link data records 305 and the node data records 303 represent a road network, such as used by vehicles, cars, and/or other entities. Alternatively, the geographic database 111 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 111 can include data about the POIs and their respective locations in the POI data records 307. The geographic database 111 can also include data about places, such as cities, towns, or other communities, and other geographic features, such as bodies of water, mountain ranges, etc. Such place or feature data can be part of the POI data records 307 or can be associated with POIs or POI data records 307 (such as a data point used for displaying or representing a position of a city).

In one embodiment, the geographic database 111 is presented according to a hierarchical or multi-level tile projection. Information, related to this tile projection is stored in the map tile records 309. More specifically, in one embodiment, the geographic database 111 may be may be defined according to a normalized Mercator projection. Other projections may be used. By way of example, the map tile grid of a Mercator or similar projection is a multilevel grid. Each cell or tile in a level of the map tile grid is divisible into the same number of tiles of that same level of grid. In other words, the initial level of the map tile grid (e.g., a level at the lowest zoom level) is divisible into four cells or rectangles. Each of those cells are in turn divisible into four cells, and so on until the highest zoom level of the projection is reached.

In one embodiment, the map tile grid may be numbered in a systematic fashion to define a tile identifier (tile ID). For example, the top left tile may be numbered 00, the top right tile may be numbered 01, the bottom left tile may be numbered 10, and the bottom right tile may be numbered 11. In one embodiment, each cell is divided into four rectangles and numbered by concatenating the parent tile ID and the new tile position. A variety of numbering schemes also is possible. Any number of levels with increasingly smaller geographic areas may represent the map tile grid. Any level (n) of the map tile grid has $2(n+1)$ cells. Accordingly, any tile of the level (n) has a geographic area of $A/2(n+1)$ where A is the total geographic area of the world or the total area of the map tile grid 10. Because of the numbering system, the exact position of any tile in any level of the map tile grid or projection may be uniquely determined from the tile ID.

In one embodiment, the system 100 may identify a tile by a quadkey determined based on the tile ID of a tile of the map tile grid. The quadkey, for example, is a one dimensional array including numerical values. In one embodiment, the quadkey may be calculated or determined by interleaving the bits of the row and column coordinates of a tile in the grid at a specific level. The interleaved bits may be converted to a predetermined base number (e.g., base 10, base 4, hexadecimal). In one example, leading zeroes are inserted or retained regardless of the level of the map tile grid in order to maintain a constant length for the one dimensional array of the quadkey. In another example, the length of the one dimensional array of the quadkey may indicate the corresponding level within the map tile grid 10. In one embodiment, the quadkey is an example of the hash or encoding scheme of the respective geographical coordinates of a geographical data point that can be used to identify a tile in which the geographical data point is located.

In one embodiment, the geographic database 111 can also include data cluster records 311 for storing the clusters of the geographical data generated by the mapping platform 101 according to the various embodiments described herein. In one embodiment, the data cluster records 311 stores just the clusters themselves. In addition or alternatively, the data cluster records 311 can store information on the incident (e.g., traffic incident) or other location-based event represented by the respective cluster. In one embodiment, the mapping platform 101 clusters and stores the geographical in the data cluster records 311 to support real-time or substantially real-time distribution of the traffic incident or event information. In one embodiment, real-time or substantially real-time refers to generating an output (e.g., a distribution of the information, or a clustering of the ingested geographical data) within a predetermined period of time from receiving an input (e.g., data collection, or ingestion of the geographical data from a source). This predetermined period can be configured from milliseconds to seconds to minutes or more of the data collection depending on how the system 100 is configured to indicate a real-time or substantially real-time scale.

In one embodiment, the geographic database 111 can be maintained by the content provider 121 in association with the services platform 119 (e.g., a map developer). The map developer can collect geographic data to generate and enhance the geographic database 111. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 111 can be a master geographic database stored in a format that facilitates updating, maintenance, and development. For example, the master geographic database 111 or data in the master geographic database 111 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle 103 or UE 105, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 111 can be a master geographic database, but in alternate embodiments, the geographic database 111 can represent a compiled navigation database that can be used in or with end user devices (e.g., vehicle 103, UE 105, etc.) to provide navigation-related functions. For example, the geographic database 111 can be used with the end user device to provide an end user with navigation features. In such a case, the geographic database 111 can be downloaded or stored on the end user device (e.g., vehicle 103, UE 105, etc.), such as in application 113, or the end user device can access the geographic database 111 through a wireless or wired connection (such as via a server and/or the communication network 107), for example.

In one embodiment, the end user device can be an in-vehicle navigation system, an autonomous vehicle control system, a personal navigation device (PND), a portable navigation device, a cellular telephone, a mobile phone, a personal digital assistant (PDA), a watch, a camera, a computer, and/or other device that can perform navigation-related functions, such as digital routing and map display. In one embodiment, the navigation device (e.g., UE 105) can be a cellular telephone. An end user can use the device navigation functions such as guidance and map display, for example, and for determination of route information to at least one identified point of interest, according to exemplary embodiments.

Figure 4:
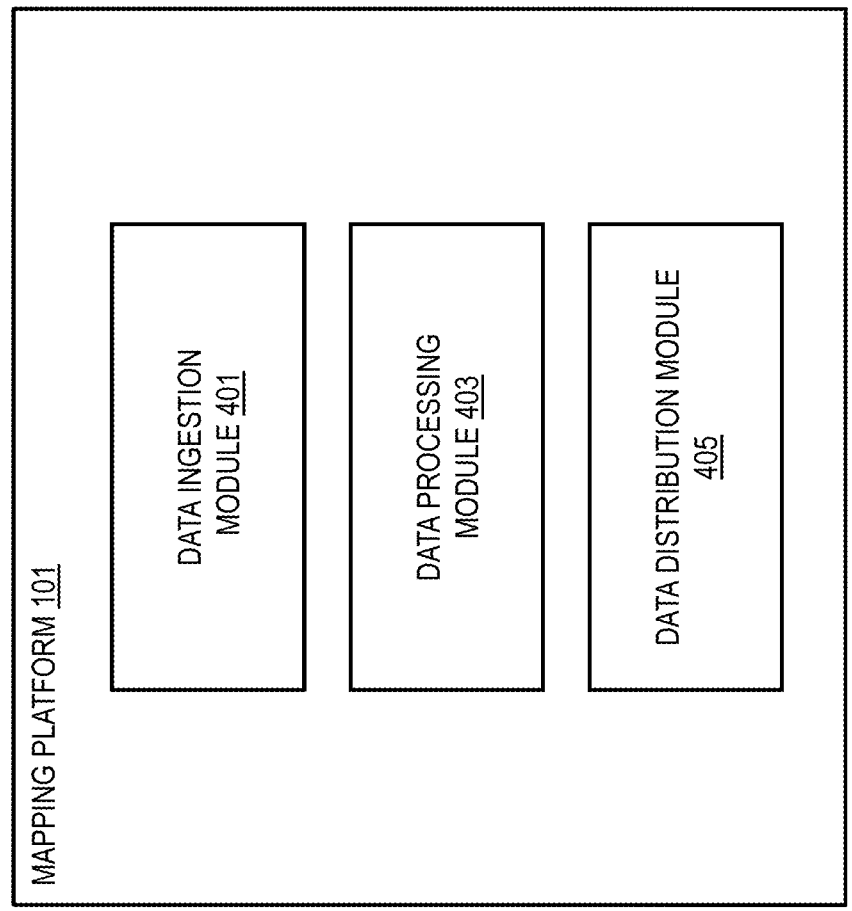
FIG. 4 is a diagram of the components of a mapping platform, according to one embodiment.

FIG. 4 is a diagram of the components of a mapping platform 101, according to one embodiment. By way of example, the mapping platform 101 includes one or more components for real-time hierarchical clustering of geographical data. It is contemplated that the functions of these components may be combined in one or more components or performed by other components of equivalent functionality. As described above, in one embodiment, the mapping platform 101 is a digital transportation infrastructure that is configured to collect, process (e.g., by clustering), and distribute real-time geographical data (e.g., data representing traffic incidents and/or other location based events). Accordingly, in this embodiment, the mapping platform 101 includes a data ingestion module 401, a data processing module 403, and a data distribution module 405.

In one embodiment, the mapping platform 101 includes the data ingestion module 401 which receives or collects geographical data points from any number of sources including, but not limited to the vehicles 103, UE 105, services 117, traffic management centers, and/or any other source of geographical data (e.g., traffic incident, location-based events, etc.). In one embodiment, the collection of the geographical data points can occur via passive or active means. For example, passive data collection from the sources includes configuring the source (e.g., the vehicle, UE 105, etc.) to automatically transmit geographical data to the data ingestion module 401 either periodically or continuously. Active data collection, for instance, includes the source being activated by a user to initiate a transmission of the geographical data on command from the user.

In one embodiment, the data ingestion module 401 can receive the geographical data from the sources as data streams in real-time. By way of example, a data stream includes an unbounded sequence of geographical data points (e.g., a sequence having no delineated beginning or ending) transmitted over time. In addition or alternatively, the data ingestion module 401 can receive the geographical data as discrete packets. In one embodiment, the geographical data may be transmitted in messages from the source, wherein the message is associated with a message type which indicates what type of incident or event is being reported (e.g., traffic incident, weather event, road obstruction, etc.). In yet another embodiment (e.g., when the source is a vehicle 103, UE 105, or otherwise equipped with appropriate sensors), the message can also include telemetry data from the reporting source. For example, a reporting vehicle 103 can include images captured from onboard cameras, data on the states of various controls or switches (e.g., wiper activation, hazard lights, airbag deployment, etc.), and the like.

In one embodiment, following data ingestion, the data processing module 403 can distribute the geographical data among computing threads of the parallel processing system 109, to perform a clustering of the geographical data to declutter the data streams and/or perform other analytics on the geographical data. For example, additional analytics may include calculating confidence values associated with the clusters can be computed to indicate a level of confidence that a cluster of geographical data points represents an incident or event, or estimating relevant distances at which an end user should be notified of a clustered incident or event.

In one embodiment, distributing the geographical data includes identifying the map tile with a coverage area that includes the geographic coordinates or each respective geographical data point and then transmitting the respective geographical data point to the computing thread assigned to process data in each map tile. In one embodiment, the initial distribution is transmitted based on map tiles at the highest level of zoom of the tile projection. Alternatively, in another embodiment, the data processing module 403 can perform the initial distribution to map tiles at any configured level of zoom.

In one embodiment, at each level of zoom, the geographical data point is evaluated to determine whether it falls within a border region of a map tile. If the data point is associated with a geographic coordinate that falls in the border region of a map tile at the current level of zoom, the geographical data point and/or the cluster in which it has been clustered at the current level of zoom is forwarded to a computing thread associated with a parent tile at a lower level of zoom. This process is performed iteratively until the geographical data point and/or resulting cluster does not fall into a border region of the parent tile. By way of example, a parent tile refers to a map tile at a lower level of zoom that includes a geographical area covered by a child tile that is at a higher level of zoom of the tile projection. In one embodiment, the tile projection is configured so that each child tile has only one parent tile. When the appropriate lower zoom level of the tile projection is reached, the computing thread associated with the parent tile at that lower zoom level processes the forwarded geographical data and/or clusters to determine a final cluster to represent a traffic incident or other location-based event. Examples of clustering techniques that can be performed by the computing threads are discussed below with respect to FIGS. 9A-11C.

In one embodiment, distribution module 405 then publishes the traffic incident and/or other location-based event to end users of the mapping platform 101. In one embodiment, the end users may be the vehicles 103 and/or UE 105 that are within a predetermined proximity of the traffic incident and/or event associated with the clustered geographical data. Because the embodiments of the hierarchical clustering described herein enables the ingested geographical data points to be clustered and/or otherwise processed through massively parallel processing, the process from data ingestion to clustering to incident publication can occur in real-time or substantially real-time (e.g., within seconds, minutes, or other specified timing).

Figure 5:
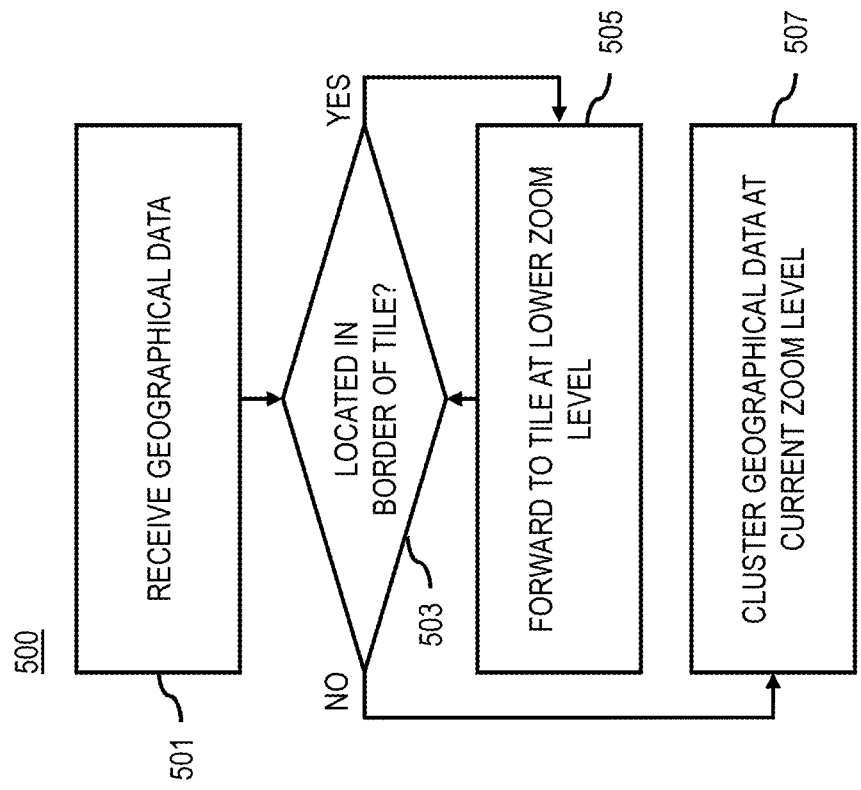
FIG. 5 is a flowchart of a process for hierarchical clustering of geographical data, according to one embodiment.
Figure 13:
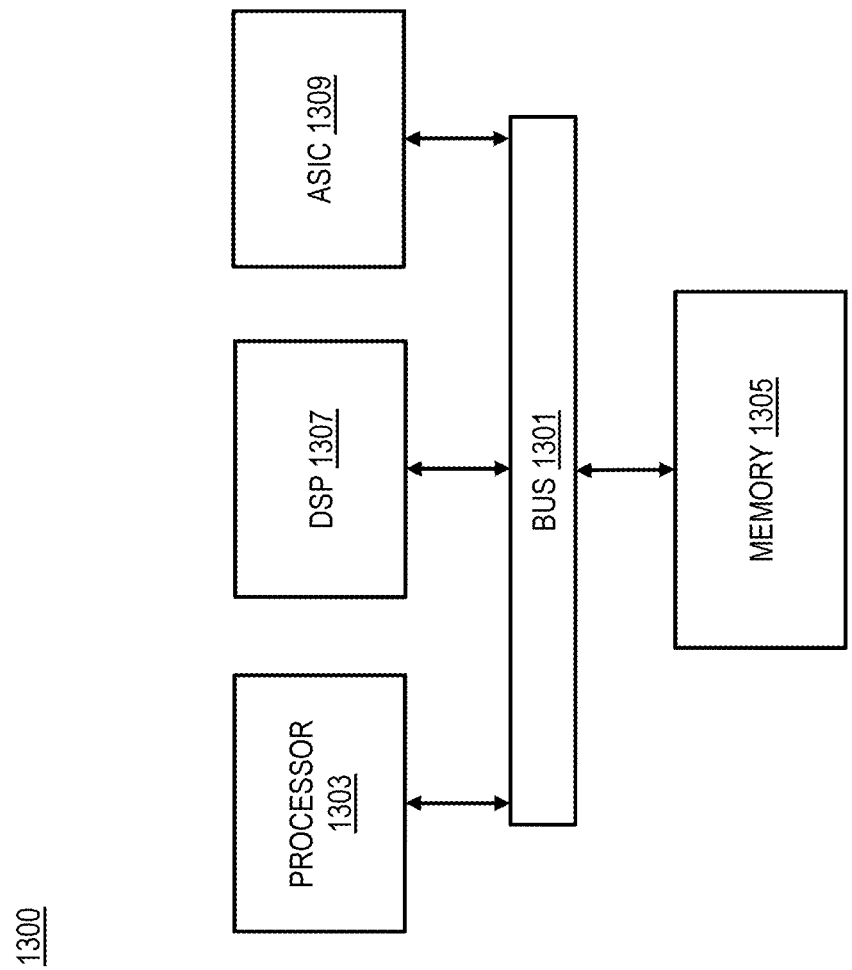
FIG. 13 is a diagram of a chip set that can be used to implement an embodiment of the invention.

FIG. 5 is a flowchart of a process for hierarchical clustering of geographical data, according to one embodiment. In one embodiment, the mapping platform 101 performs the process 500 and is implemented in, for instance, a chip set including a processor and a memory as shown in FIG. 13.

In step 501, the mapping platform 101 receives a request to cluster the geographical data by a location of the geographical data within a geographical area, wherein the geographical area is represented by the hierarchical tile projection comprising a plurality of zoom levels, and wherein one or more tiles of each of the plurality of zoom levels represent different respective scales of a corresponding portion of the geographical area. As previously discussed, hierarchical tile projection can be a Mercator projection or any other projection that includes multiple zoom levels. In one embodiment, the projection need not include coverage of the entire world surface, but may be limited to specific regions, countries, provinces, states, cities, neighborhoods, etc. It is contemplated that any scale of coverage can be used. In addition, each tile or cell of the projection need not be regularly shaped (e.g., square or rectangle), but can be defined according to any shape or boundary. In yet another embodiment, the each tile can be dynamically sized or shaped (e.g., based on volumes of actual data streams). For example, tiles covering more populated regions or areas (e.g., cities) can be of smaller areas at any given zoom level compared to tiles associated with more rural areas (e.g., wherein less geographical data is expected to be generated).

In one embodiment, the clustering is performed using a parallel processing system. Respective computing threads of the parallel processing system are then respectively assigned to cluster data for each of the one or more tiles of the hierarchical tile projection in parallel. In the context of such a parallel processing system, the geographical data is received a first computing thread of the parallel processing system. In one embodiment, computing threads associated with tiles at the maximum zoom level are configured to first receive the ingested geographical data streams for clustering according to the embodiments described herein. In one embodiment, the maximum zoom level for initial processing is equal to the highest zoom level available in the tile projection (e.g., a zoom level at which there are no further child tiles). Alternatively, the system 100 can set an available zoom level of the tile projection as the maximum zoom level for baseline or initial processing. For example, if there are fewer computing threads available than the number of tiles at a given zoom level, the system 100 can set the maximum zoom level at a lower zoom level to match the available number of computing threads or nodes.

In one embodiment, the geographical data relates to one or more location-based events occurring in the geographical area. For example, the geographical data includes one or more incident reports reported by one or more vehicles traversing a transportation network, and wherein the clustering of the geographical data comprises grouping the one or more incident reports into a cluster when the one or more incident reports are determined to be related to a common location-based event. For example, one source of geographical data streams indicating traffic incidents or other events are connected vehicles 103 traveling in a road network. In one embodiment, the vehicles 103 can be automatically configured to passively transmit real-time streams of sensor data from the vehicles 103.

In one embodiment, this data stream can include, for instance, location data (e.g., satellite based location), brake pressure information, headlight activation status, windshield wiper activation status, camera imagery taken as the vehicle drives, fog light activation, ignition status, hazard light activation, parking sensor information, and/or any other sensor information available from the vehicles. In one embodiment, the mapping platform 101 can process this sensor information to detect or otherwise infer potential incidents occurring the roadway without an explicit or active report from the vehicle. Such continuous streams can result in large volumes of data when participating reporting vehicles reach into the thousands or even millions of users. Accordingly, the embodiments of the hierarchical clustering processes described herein can advantageously enable the mapping platform 101 to ingest, process, and distribute incident data in real-time.

As part of this hierarchical clustering process, in step 503, the mapping platform 101 determines whether the geographical data is located in a border area of a first tile at a higher zoom level of the hierarchical tile projection. It is contemplated that data occurring within the border area can potentially be part of a cluster that spans beyond the current map tile. In one embodiment, the mapping platform 101 specifies the border area of the first tile, the border area of the second tile, or a combination thereof based on a predetermined distance from respective boundaries of the first tile, the second tile, or a combination thereof. For example, the border can be defined as an area or region within the map tile but some distance from the boundary of the tile.

In one embodiment, the mapping platform 101 calculates the predetermined distance based on a clustering distance of the cluster. For example, as described further below, the clustering distance is the distance from a given point that another data point must fall to be grouped in the same cluster. Accordingly, if a given geographical data point is located within a border area, the distance from that point to the boundary of a tile would be less than the clustering distance. This then gives rise to the potential of missing potential clusters that would otherwise span tiles, thereby resulting in a potentially more cluttered processed stream. This is because points that are close together (e.g., with the clustering distance) would not be clustered because they span different tiles, and are therefore being processed by different computing threads.

If the geographical data is located in the border area or region of the tile, the mapping platform 101 recursively forwards, by the processor, the geographical data for clustering at a lower zoom level of the hierarchical tile projection until the geographical data is not located in a border area of a second tile at the lower zoom level (step 505). By forwarding the geographical data and/or associated cluster to tiles at lower zoom levels where there the cluster or geographical data is not likely to span a tile boundary, the mapping platform 101 can advantageously use a computing thread to cluster the forwarded data or clusters, while maintaining a massively parallel processing scheme. The mapping platform 101 then initiates the clustering of the geographical data into a cluster located in the second tile at the lower zoom level. In one embodiment, the second tile is a parent tile of the first tile, and wherein the first tile has only one parent tile.

In one embodiment, in the context of a parallel processing system, the forwarding of the geographical data is to a second computing thread assigned to the second tile. The second computing thread then performs the clustering of the forwarded data and/or clusters.

In one embodiment, the mapping platform 101 optionally initiates a clustering of the geographical data into an initial cluster at the first tile at the higher level of zoom. In this embodiment, the forwarding of the geographical data comprises forwarding the initial cluster including the geographical data.

In one embodiment, the mapping platform 101 optionally flags the initial cluster to indicate that subsequently received geographical data that belongs in the initial cluster is to be forwarded to the second tile. In other words, the flagging of the cluster indicates that the cluster has been forwarded to a lower zoom level. In one embodiment, the flagging of the cluster in the first tile comprises adding a value to metadata associated with the cluster to indicate that the cluster has been forwarded. In one embodiment, the flagging of the cluster in the first tile is maintained after the geographical data is expired.

In one embodiment, the mapping platform 101 can use the flag to determine whether to forward other geographical data received by the mapping platform 101. For example, the mapping platform 101 can receive subsequent geographical data at the first computing thread. The mapping platform 101 then determines that the subsequent geographical data is to be clustered in the cluster in the first tile, and initiates a forwarding to the subsequent geographical data to the second computing thread when the cluster is flagged.

If the geographical data is not located in the border area or region of the tile, the mapping platform 101 clusters the geographical data at the current zoom level of the first tile (step 507).

Figure 6:
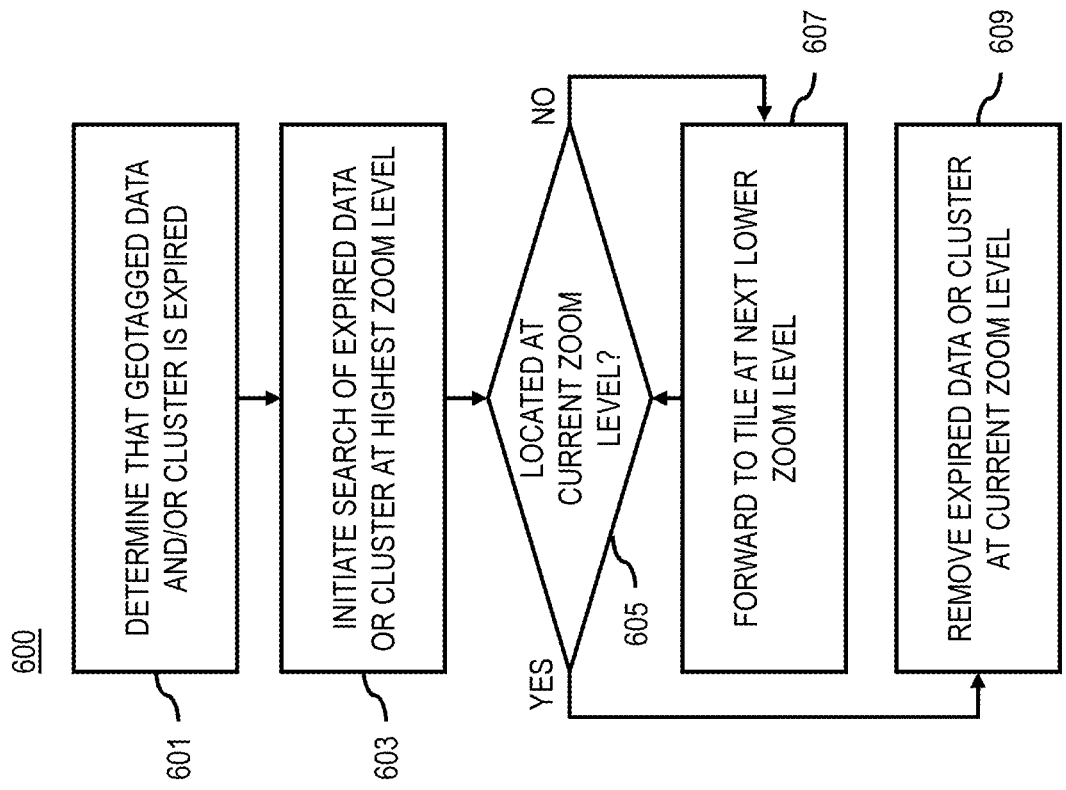
FIG. 6 is a flowchart of a process for processing expired data in a hierarchical clustering of geographical data, according to one embodiment.

FIG. 6 is a flowchart of a process for processing expired data in a hierarchical clustering of geographical data, according to one embodiment. In one embodiment, the mapping platform 101 performs the process 600 and is implemented in, for instance, a chip set including a processor and a memory as shown in FIG. 13.

In step 601, the mapping platform 101 determines that the geographical data or the cluster containing the geographical data has expired. In one embodiment, the mapping platform 101 uses the same hierarchical process used for clustering data to remove expired data and/or clusters.

For example, in step 603, the mapping platform 101 initiates a removal of the expired geographical data from the initial cluster beginning at the higher zoom level of the hierarchical tile projection. In one embodiment, the mapping platform 101 can search in the corresponding map tile at the highest zoom level for the expired geographical data and/or the cluster.

In step 605, the mapping platform 101 determines whether the expired geographical data and/or cluster is present at the current zoom level and/or over whether the expired geographical data and/or cluster is located in a border region of the current tile.

If the expired geographical data and/or cluster is found in the border region of the current tile (or if the cluster in the current tile was flagged has having been forwarded previously), the mapping platform 101 forwards the request to remove the expired geographical data and/or cluster to the parent tile at the next lower zoom level (step 607). For example, the current tile indicates the map tile at the current zoom level being processed. This process can proceed recursively until the mapping platform 101 reaches a lower zoom level at which the expired geographical data and/or cluster is no longer in a border area of the parent tile.

In step 609, the mapping platform 101 removes the expired geographical data and/or cluster at each zoom level which includes the expired geographical data and/or cluster. As previously noted, in one embodiment, by starting from the highest zoom level and progressing towards lower zoom levels in one direction, the mapping platform 101 can avoid race conditions that can result from multiple threads or processes acting on the same data.

Figure 7:
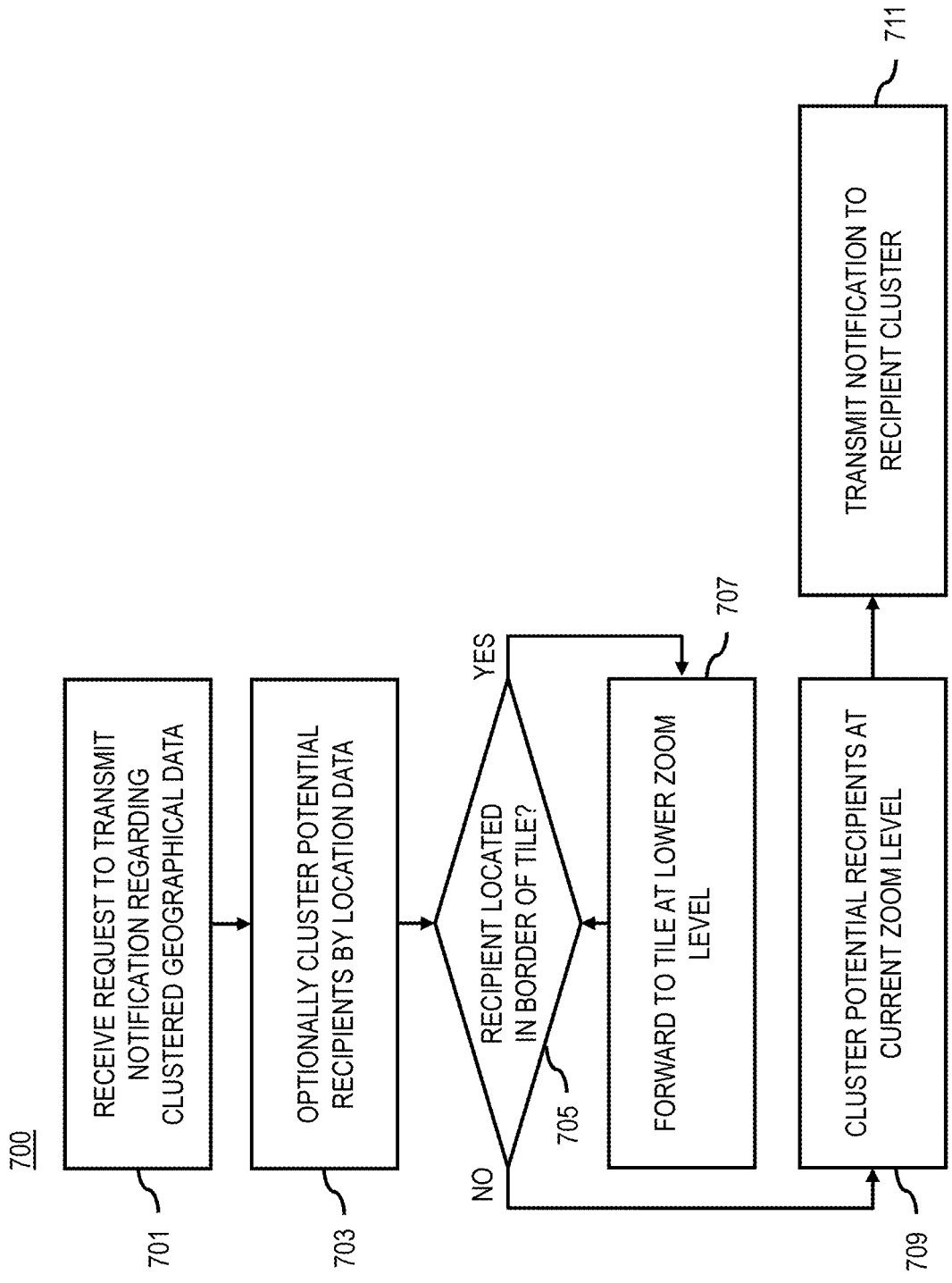
FIG. 7 is a flowchart of a process for publishing notifications based on hierarchical clustering, according to one embodiment.

FIG. 7 is a flowchart of a process for publishing notifications based on hierarchical clustering, according to one embodiment. In one embodiment, the mapping platform 101 performs the process 700 and is implemented in, for instance, a chip set including a processor and a memory as shown in FIG. 13.

In one embodiment, the mapping platform 101 provides for real-time publishing or distribution of notifications regarding incidents and/or events associated with the geographical data that have been clustered according to the embodiments described herein. In step 701, the mapping platform 101 receives a request to transmit a notification message regarding geographical data that has been clustered.

In one embodiment, in step 703, the mapping platform 101 optionally can employ hierarchical clustering as described in the various embodiments discussed herein to select potential recipient devices (e.g., vehicles 103 and/or UE 105) that are to receive the requested notification. By way of example, clustering recipient devices enables the mapping platform 101 to group transmissions and notifications messages to reduce transmission resources (e.g., network bandwidth and associated computing resources). Accordingly, as part of the received geographical data or as separate messages from the recipient devices, the mapping platform 101 can receive geographical data indicating respective locations of the devices.

In step 705, as with the process for generally clustering geographical data, the mapping platform 101 determines (e.g., at a highest zoom level or a predetermined zoom level) whether the location data for each recipient device indicates that the device is located in a border area of a corresponding map tile.

If the located in the border region of the tile, the mapping platform clusters the recipient devices into an initial device cluster at the tile of the higher zoom level, and then forwards the cluster and/or the location data of the recipient devices to a parent tile at a lower zoom level for clustering if the recipient devices are not also located in a border region of the parent tile. The forwarding can occur recursively until a lower zoom level is reached where the recipient devices are not located in the border area of the parent tile (stop 707).

Once an appropriate lower zoom level is reached, the mapping platform 101 can cluster the recipient devices in a device cluster (step 709). The mapping platform 101 can then transmit or publish the requested notification to the device cluster (step 711).

Figure 8:
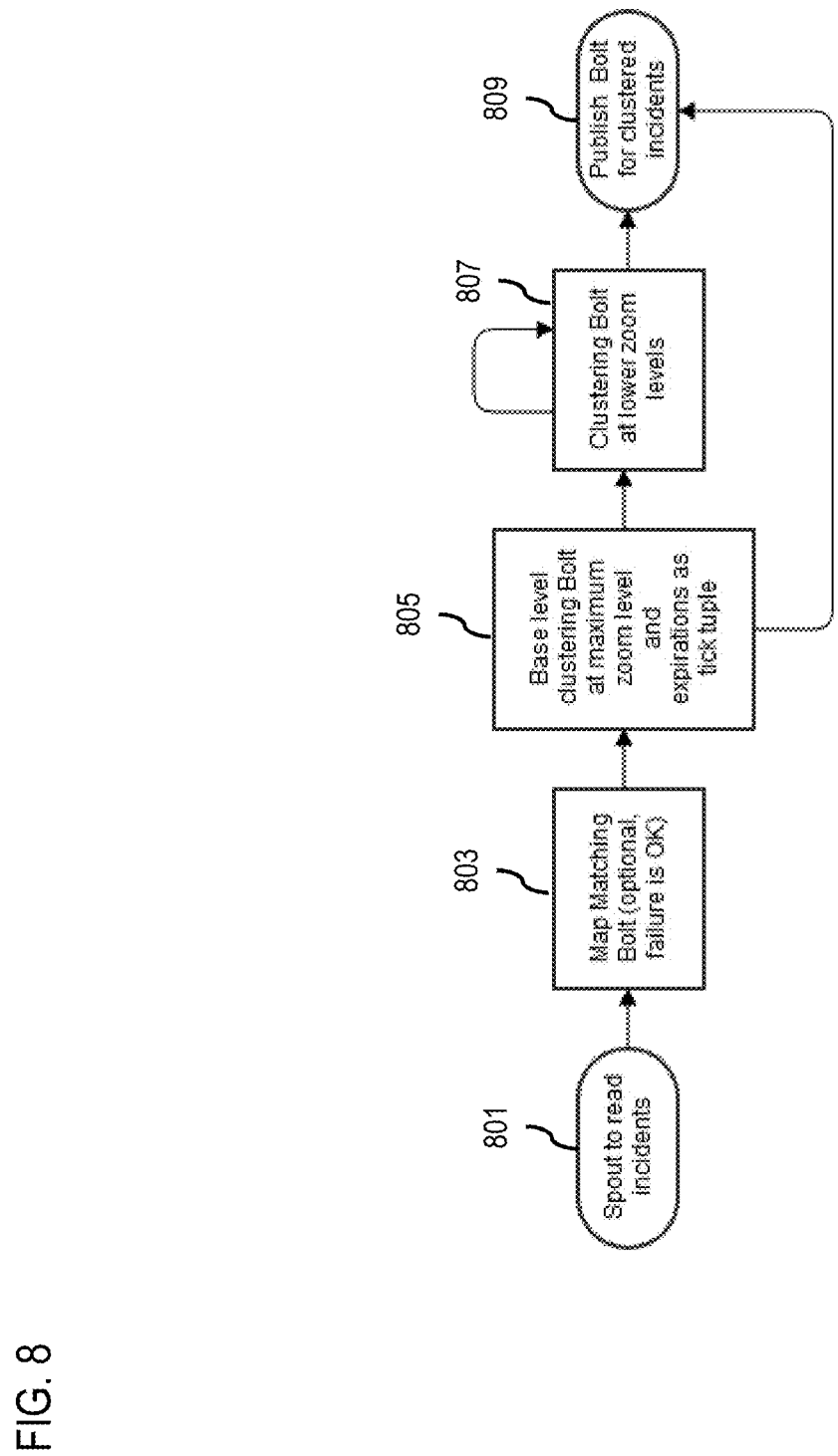
FIG. 8 is a flowchart of a process for providing hierarchical clustering in an example parallel processing system, according to one embodiment.

FIG. 8 is a flowchart of a process for providing hierarchical clustering in an example parallel processing system, according to one embodiment. In this example, the mapping platform 101 uses an Apache Storm topology to perform the hierarchical clustering described herein. Apache Storm is a distributed-node stream processing framework that is designed from processing data streams in real-time, and is an example embodiment of the parallel processing system 109 described above.

In an Apache Storm topology, "spouts" and "bolts" form the basis of the topology. In one embodiment, a spout is a process that serves a source or ingestion point of data streams in a computation. As described above, a data stream is an unbounded sequence of data. This data is typically represented as a sequence of tuples which are ordered lists of data elements. Once a spout is established, bolts can be defined as processes (e.g., executable on individual computing threads or a parallel system) that can operate on the input streams of the spouts to produce output streams. By way of example, bolts can run functions; filter, aggregate, or join data; and/or interact with databases. Multiple spouts and/or bolts can be connected to form a functional process.

An example Apache topology for hierarchical clustering is illustrated in FIG. 8. As shown, a spout 801 is created to read or ingest geographical data representing location-based incidents or events. The geographical data is provided as data streams from, for instance, the vehicles 103 and/or UE 105. The spout 801 provides the ingested data streams as an output stream to the map matching bolt 803. In one embodiment, the map matching bolt 803 is an optional bolt that processes the geographical data provided by the spout 801 to match the associated location data to underlying map features or data (e.g., map matching to an existing road). The map matching bolt 803 produces an output stream of map matched data regardless of whether map matching was successful or actually performed for input into a clustering bolt 805.

In one embodiment, respective clustering bolts 805 (although only one bolt 805 is shown in FIG. 8) are assigned to respective map tiles and responsible for processing geographical data streams of data located within the respective coverage geographical coverage area of the tiles. In one embodiment, the bolt 805 is assigned to a maximum zoom level of the tile projection to process the geographical data to determine whether the data is located in border areas of the respective tile. If the geographical data is located in the border area, the data is recursively clustered and forwarded to a bolt 807 associated with a parent tile at a lower zoom level until the geographical data or cluster is no longer located in a border region of a parent tile. In one embodiment, expirations of the geographical data and/or cluster is handled as tick tuples which occur at scheduled or recurring times to evaluate for data expirations.

Once clustered by either the bolt 805 and/or the bolt 807, the clustered geographical data provided as an output stream to the publishing bolt 809. The publishing bolt 809 produces an output stream comprising clustered incidents and/or events derived from the ingested geographical data stream. In one embodiment, the topology of FIG. 8 runs continuously to produce real-time results, until the processes are killed.

FIGS. 9A-9E are diagrams illustrating example clustering processes, according to various embodiments. The mapping platform 101, as described in the embodiments above, relies on a clustering process to group together one or more geographic coordinates or other location data points representing location-based observations (e.g., incident observations) into a cluster. In one embodiment, the mapping platform 101 then selects a single location point (e.g., a single latitude/longitude point) to represent the cluster. The mapping platform 101 can also include additional metadata to describe the cluster including, but not limited to a unique cluster ID, a confidence value, a relevant distance, a message type, a time to live, and/or a cluster forwarding flag.

In one embodiment, the message type of the cluster is the key of a mapping to which all strategies (metadata and clustering) are assigned. For example, a cluster representing an accident may have a different clustering strategy and confidence strategy than dangerous weather, but use the same relevant distance strategy.

In one embodiment, as noted above, a cluster is a collection of latitude/longitude points, but a strategy can be applied to determine a single point to represent the entire cluster. Strategies include, but are not limited to, averaging the latitude/longitude of all points, averaging the latitude/longitude of the X most recent points, using the latitude/longitude of the most recent point added to the cluster, and/or using the latitude/longitude of the first point that created the cluster.

In one embodiment, with respect to the confidence value, a decimal confidence value, for instance, between 0 and 1 is assigned to a cluster. One example strategy for determining the confidence value includes, but is not limited to, linearly increasing confidence as new points are added to the cluster until some maximum value is reached. Under this example approach, the maximum value will typically be less than 1 unless overridden.

In one embodiment, a cluster is assigned a relevant distance which represents the distance in meters at which a client should become aware of the cluster. Two example strategies for determining the relevant distance include, but are not limited to, always setting the relevant distance to a certain value, and setting the relevant distance based on a functional class of the road to which the cluster has been map matched to.

In one embodiment, a time-to-live (TTL) value is assigned to a cluster to represent when the cluster should be removed from the system. In one embodiment, the TTL value is also applied to individual new data points.

In one embodiment, a unique cluster ID is specified for each cluster in the system, so that updates to a cluster can be recognized as such in downstream systems.

Figure 9B:
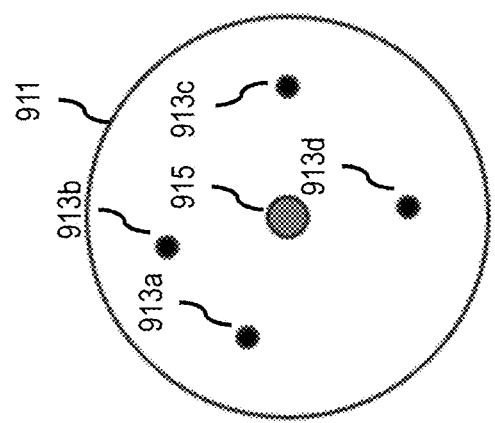
FIGS. 9A-9E are diagrams illustrating example clustering processes, according to various embodiments.
Figure 9A:
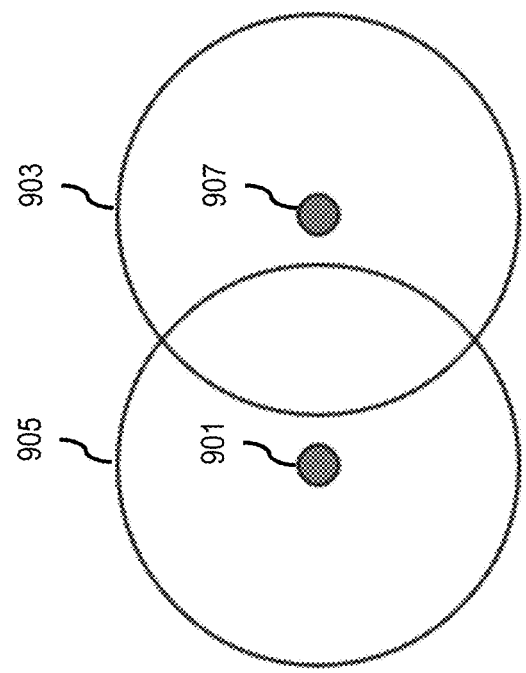

As shown in FIG. 9A, when a new geographical data point 901 enters into the system, the mapping platform 101 first checks to see if the data point 901 should be added to an existing cluster 903, and if not, create a new cluster 905 containing just that single point 901. The essence of determining whether a new point 901 should be added to an existing cluster 903 is to check the distance in meters to some reference point(s) 907 within the existing cluster 903 to the new point 901. As shown in FIG. 9B, a cluster 911 can contain a collection of multiple points 913a-913d, but is still represented by a single point 915, which is not necessarily one of the input points 913a-913d.

Figure 9D:
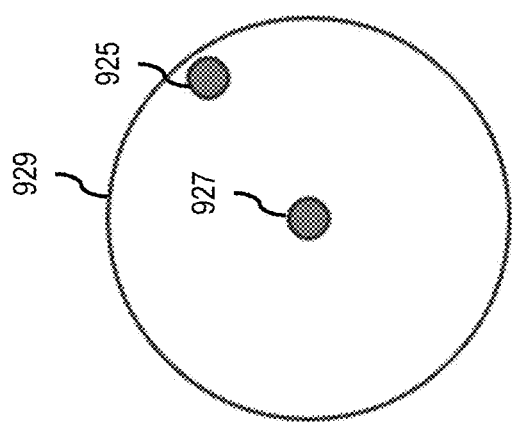
Figure 9C:
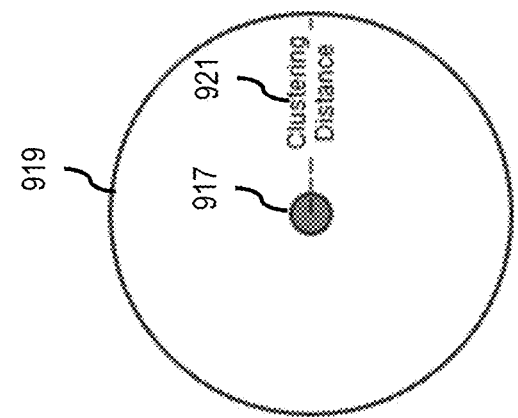

In one embodiment, as shown in FIG. 9C, when a new point 917 enters the system, a new cluster 919 can be created. On creation of the cluster 919, the mapping platform 101 can also specify a clustering distance 921 associated with the cluster. The clustering distance, for instance, as a distance from the representative point 917 of the cluster in which other data points falling within that distance would also be grouped in the cluster 919. In one embodiment, the clustering distance can determined based on the type of geographical data being clustered. For example, the clustering distance for an accident report may be less than a clustering distance for an inclement weather report. In addition, it is contemplated that the clustering distance can be dynamic (e.g., increasing or decreasing as additional data points are added to the cluster). Although the clustering distance 921 is depicted as a radius around the data point 917, it is contemplated that the clustering distance be irregularly shaped or take on any configured shaped. For example, an underlying map topology (e.g., the shape of a road or map feature) may be used to calculate the clustering distance 921. In one embodiment, the clustering distance may be configured using machine learning or other automated processes, or configured manually by a system administrator. FIG. 9D illustrates and example of clustering based on a clustering distance. As shown, a new data point 925 enters the system, and is determined to be within the clustering distance from the representative point 927 of the cluster 929. Accordingly, the mapping platform 101 includes the data point 925 in the existing cluster 929.

Figure 9E:
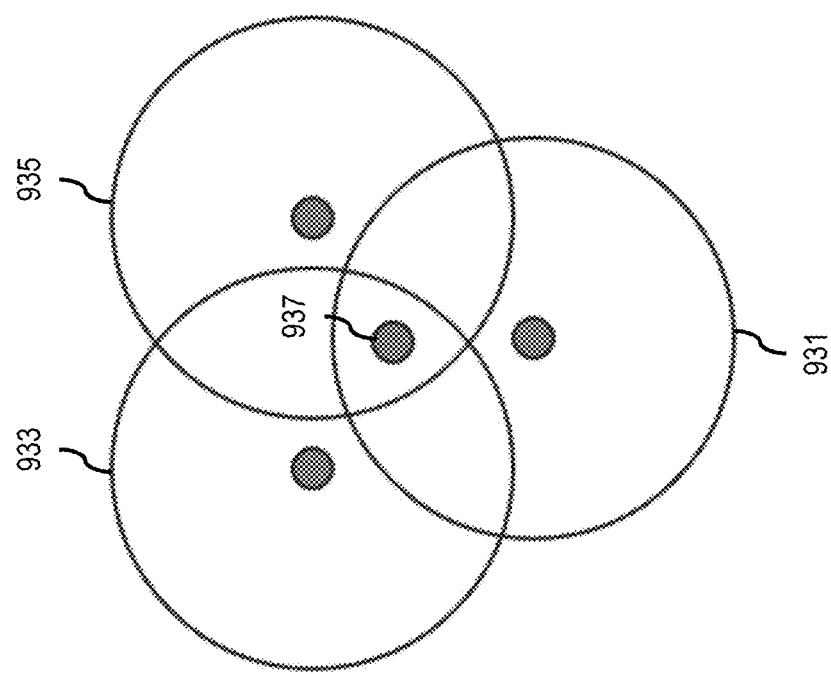

In one embodiment, as shown in FIG. 9E, clusters 931-935 can be merged together if a new point 937 would join one or more clusters 931-935 together. In one embodiment, when clusters 931-935 are merged, a strategy is applied to identify a "winning" cluster that will contain all of the points from all of the merged clusters. The "losing" clusters will be removed from the system and explicit cancellation messages will be sent for them.

Figure 10:
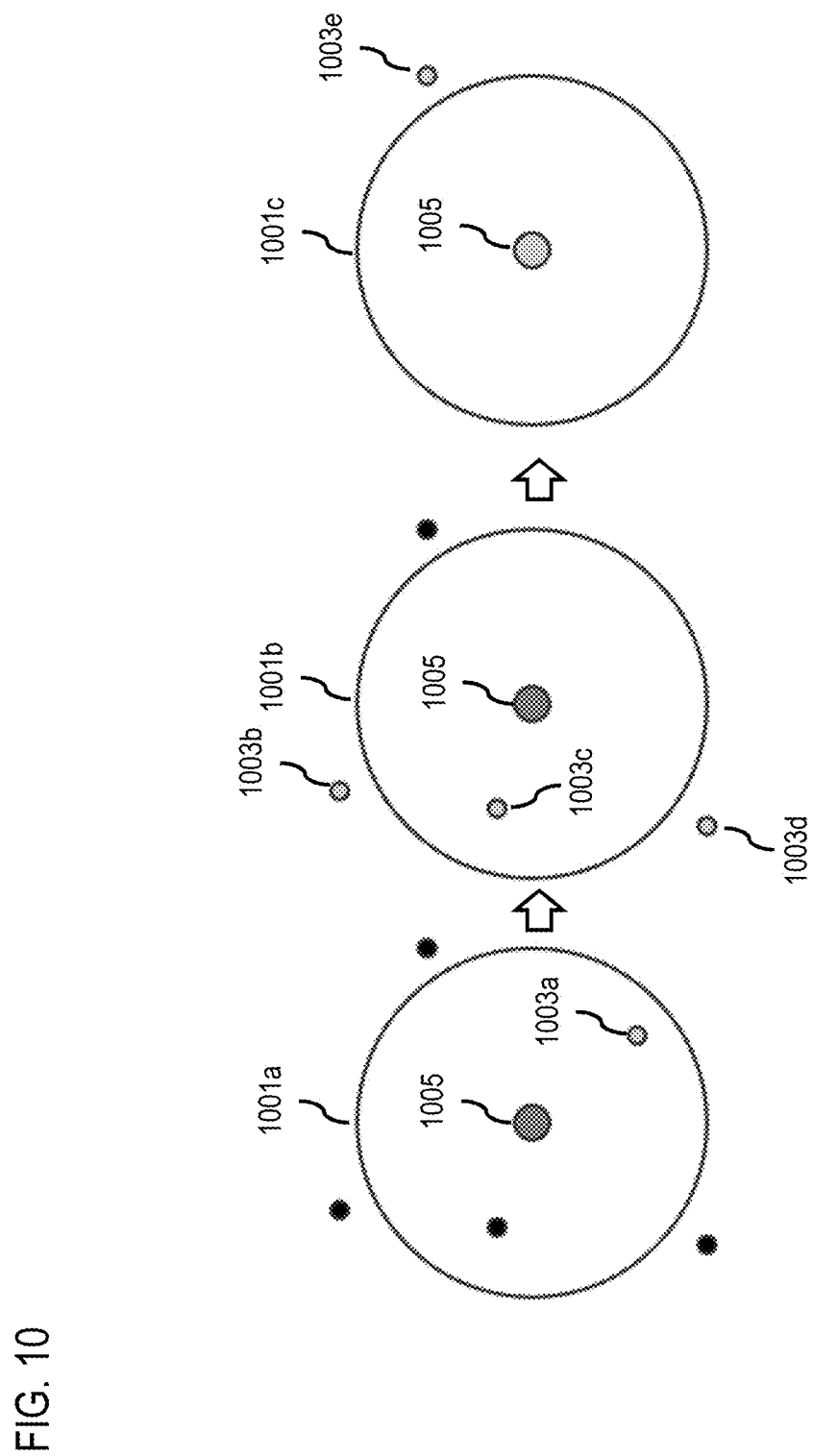
FIG. 10 is a diagram illustrating cluster expiration, according to one embodiment.

FIG. 10 is a diagram illustrating cluster expiration, according to one embodiment. In one embodiment, both clusters and points within a cluster expire (e.g., according to a specified TTL value). In one embodiment, when a point 1003a within a cluster 1001a expires, the point 1003a is removed from the cluster 1001a, but the metadata is not re-calculated (e.g., the representative point 1005 remains the same) and no update is sent out. As shown in FIG. 10, the expiration of point 1003a results in cluster 1001b with the same representative point 1005. As more data points 1003b-1003d expire from the cluster 1001b, the metadata remains unaffected, resulting in the cluster 1001c with the same representative point 1005. In one embodiment, when the last point 1003e from the cluster 1001c expires, the cluster 1001c is removed. In one embodiment, the clusters 1001a-1001c are not evaluated for being split into multiple clusters when data points contained therein expire.

In one embodiment, overrides (e.g. events or data originating from an authorized party or system administrator) can enter the system and are clustered in the same manner as other points, but will perform absolute overrides of the Cluster Metadata, including final latitude/longitude values. In one embodiment, additional points that are then added to a cluster with an override present are effectively ignored.

In one embodiment, overrides also not only override TTL, but if the cluster override expires, it will automatically expire all other points in the same cluster. In one embodiment, if an override is received with a TTL of zero, in addition to expiration of all point(s) in the cluster, an explicit cancellation is sent out.

FIGS. 11A-11E are diagrams illustrating example clustering strategies, according to one embodiment. In one embodiment, the mapping platform 101 can employ various clustering strategies in combination with embodiments the hierarchical clustering described herein. Two example strategies that can be applied when checking to see whether a new point can be added to an existing cluster include, but are not limited to, checking the distance from the cluster latitude/longitude point or by checking the distance from all existing point(s) within the cluster. Another example strategy includes always rejecting adding new points to an existing cluster.

Examples of such strategies are illustrated in FIGS. 11A-11D. As show in FIG. A, a cluster 1101's final point 1103 is the sole determinant of whether a new point 1105 should be added to the cluster 1101. For example, if the new point 1105 is within the clustering distance it will be included in the cluster 1101. This is true even if a new point 1107 is otherwise very close to existing points of the cluster 1101 (e.g., point 1109). In this case, a new cluster (not shown) would be created for point 1107. Alternatively, as shown in the cluster 1111 in FIG. 11B, another strategy is to permit the cluster 1111 to contain points outside the clustering radius or distance of the cluster's final point 1113.

Figure 11B:
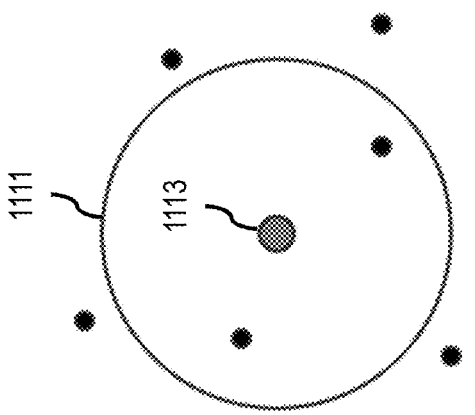
FIGS. 11A-11E are diagrams illustrating example clustering strategies, according to one embodiment.
Figure 11A:
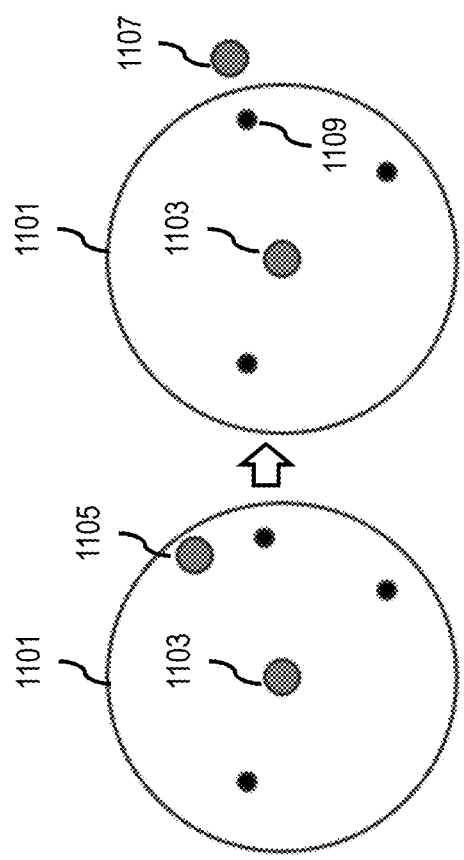
Figure 11D:
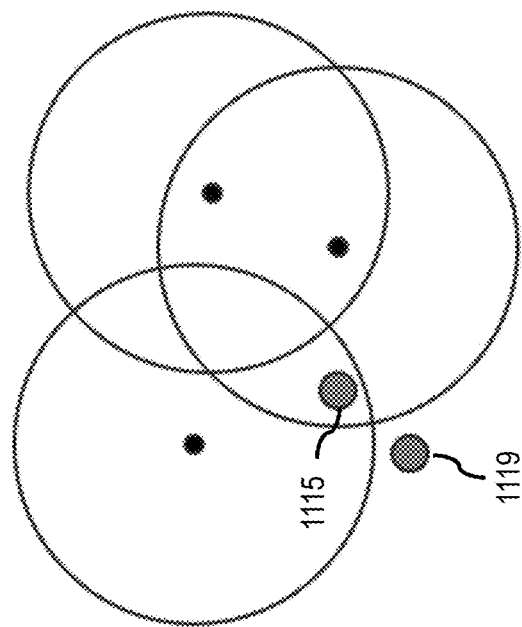
Figure 11C:
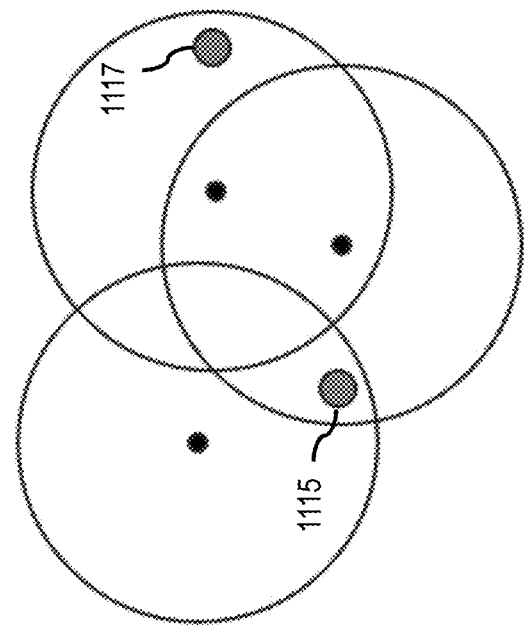

As shown FIG. 11C, under another example strategy, a cluster's final point 1115 is not relevant to the clustering algorithm, and the new point 1117 will be checked against the clustering distance of every point in the cluster before being added. As shown in FIG. 11D, this is true even if the new point 1119 is otherwise very close to the final or representative point 1115. In this example, a new cluster (not shown) is created for the new point 1119.

Figure 11E:
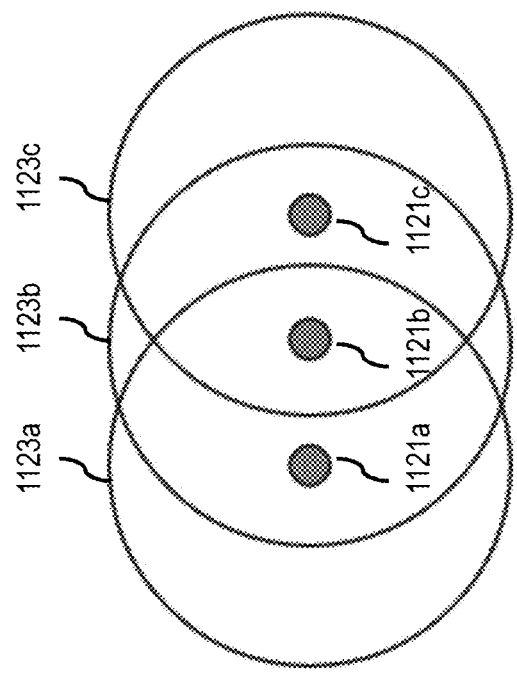

FIG. 11E illustrates another example strategy where no clustering is performed. Under this non-clustering strategy, each new point 1121*a*-1121*c* added to system will result in creation of a respective cluster 1123*a*-1123*c* containing just each new point 1121*a*-1121*c*. Under this strategy, the system 100 can be effectively configured to process each geographical data point independently.

The processes described herein for providing real-time hierarchical clustering of geographical data may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 12:
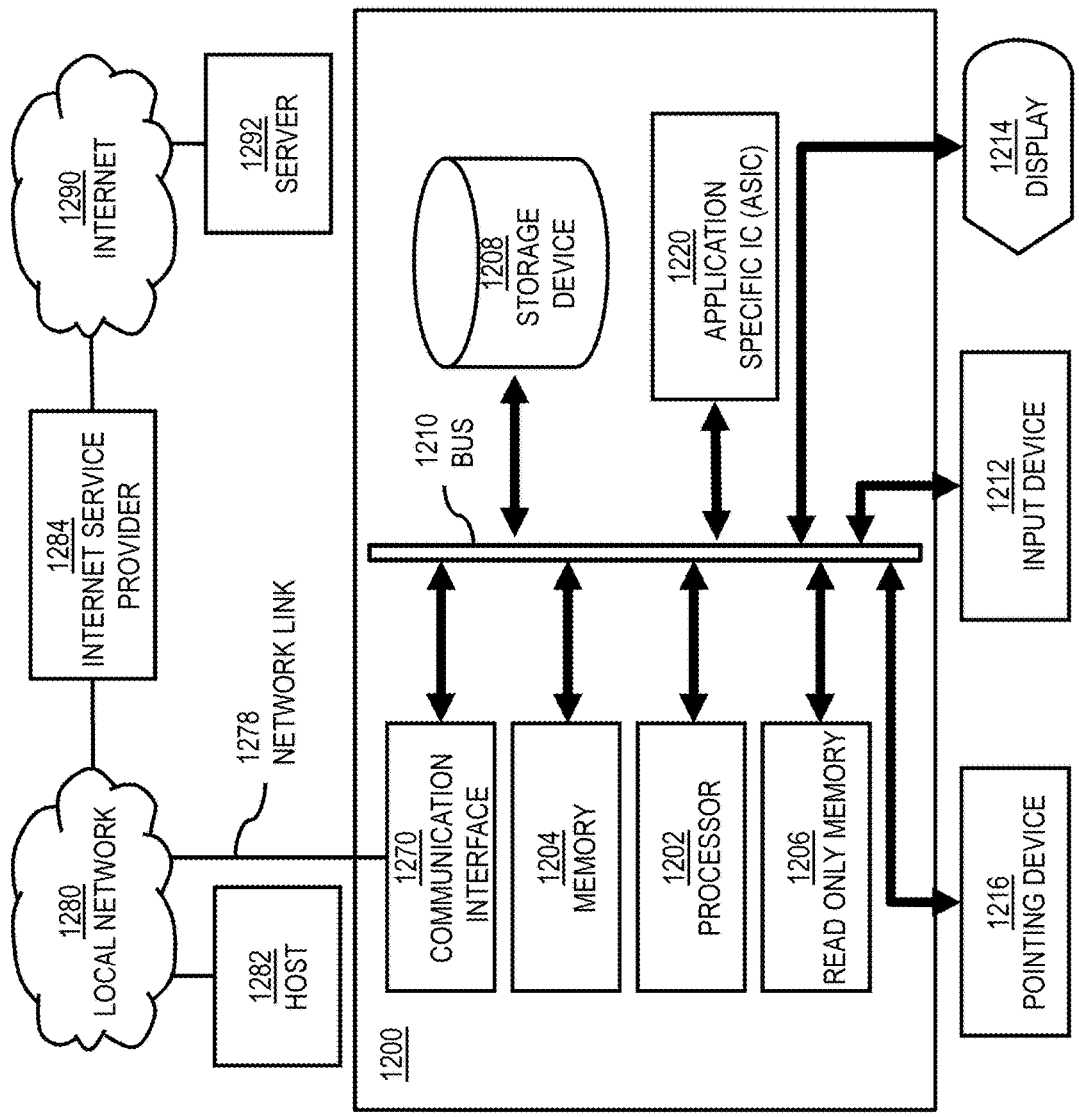
FIG. 12 is a diagram of hardware that can be used to implement an embodiment of the invention.

FIG. 12 illustrates a computer system 1200 upon which an embodiment of the invention may be implemented. Computer system 1200 is programmed (e.g., via computer program code or instructions) to provide real-time hierarchical clustering of geographical data as described herein and includes a communication mechanism such as a bus 1210 for passing information between other internal and external components of the computer system 1200. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1210 includes one or more parallel conductors of information so that information is transferred quickly among devices coupled to the bus 1210. One or more processors 1202 for processing information are coupled with the bus 1210.

A processor 1202 performs a set of operations on information as specified by computer program code related to providing real-time hierarchical clustering of geographical data. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1210 and placing information on the bus 1210. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1202, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1200 also includes a memory 1204 coupled to bus 1210. The memory 1204, such as a random access memory (RAM) or other dynamic storage device, stores information including processor instructions for providing real-time hierarchical clustering of geographical data. Dynamic memory allows information stored therein to be changed by the computer system 1200. RAM allows a unit of information stored at a location called a memory address to be stored and retrieved independently of information at neighboring addresses. The memory 1204 is also used by the processor 1202 to store temporary values during execution of processor instructions. The computer system 1200 also includes a read only memory (ROM) 1206 or other static storage device coupled to the bus 1210 for storing static information, including instructions, that is not changed by the computer system 1200. Some memory is composed of volatile storage that loses the information stored thereon when power is lost. Also coupled to bus 1210 is a non-volatile (persistent) storage device 1208, such as a magnetic disk, optical disk or flash card, for storing information, including instructions, that persists even when the computer system 1200 is turned off or otherwise loses power.

Information, including instructions for providing real-time hierarchical clustering of geographical data, is provided to the bus 1210 for use by the processor from an external input device 1212, such as a keyboard containing alphanumeric keys operated by a human user, or a sensor. A sensor detects conditions in its vicinity and transforms those detections into physical expression compatible with the measurable phenomenon used to represent information in computer system 1200. Other external devices coupled to bus 1210, used primarily for interacting with humans, include a display device 1214, such as a cathode ray tube (CRT) or a liquid crystal display (LCD), or plasma screen or printer for presenting text or images, and a pointing device 1216, such as a mouse or a trackball or cursor direction keys, or motion sensor, for controlling a position of a small cursor image presented on the display 1214 and issuing commands associated with graphical elements presented on the display 1214. In some embodiments, for example, in embodiments in which the computer system 1200 performs all functions automatically without human input, one or more of external input device 1212, display device 1214 and pointing device 1216 is omitted.

In the illustrated embodiment, special purpose hardware, such as an application specific integrated circuit (ASIC) 1220, is coupled to bus 1210. The special purpose hardware is configured to perform operations not performed by processor 1202 quickly enough for special purposes. Examples of application specific ICs include graphics accelerator cards for generating images for display 1214, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1200 also includes one or more instances of a communications interface 1270 coupled to bus 1210. Communication interface 1270 provides a one-way or two-way communication coupling to a variety of external devices that operate with their own processors, such as printers, scanners and external disks. In general the coupling is with a network link 1278 that is connected to a local network 1280 to which a variety of external devices with their own processors are connected. For example, communication interface 1270 may be a parallel port or a serial port or a universal serial bus (USB) port on a personal computer. In some embodiments, communications interface 1270 is an integrated services digital network (ISDN) card or a digital subscriber line (DSL) card or a telephone modem that provides an information communication connection to a corresponding type of telephone line. In some embodiments, a communication interface 1270 is a cable modem that converts signals on bus 1210 into signals for a communication connection over a coaxial cable or into optical signals for a communication connection over a fiber optic cable. As another example, communications interface 1270 may be a local area network (LAN) card to provide a data communication connection to a compatible LAN, such as Ethernet. Wireless links may also be implemented. For wireless links, the communications interface 1270 sends or receives or both sends and receives electrical, acoustic or electromagnetic signals, including infrared and optical signals, that carry information streams, such as digital data. For example, in wireless handheld devices, such as mobile telephones like cell phones, the communications interface 1270 includes a radio band electromagnetic transmitter and receiver called a radio transceiver. In certain embodiments, the communications interface 1270 enables connection to the communication network 107 for providing real-time hierarchical clustering of geographical data.

The term computer-readable medium is used herein to refer to any medium that participates in providing information to processor 1202, including instructions for execution. Such a medium may take many forms, including, but not limited to, non-volatile media, volatile media and transmission media. Non-volatile media include, for example, optical or magnetic disks, such as storage device 1208. Volatile media include, for example, dynamic memory 1204. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 13 illustrates a chip set 1300 upon which an embodiment of the invention may be implemented. Chip set 1300 is programmed to provide real-time hierarchical clustering of geographical data as described herein and includes, for instance, the processor and memory components described with respect to FIG. 12 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1300 includes a communication mechanism such as a bus 1301 for passing information among the components of the chip set 1300. A processor 1303 has connectivity to the bus 1301 to execute instructions and process information stored in, for example, a memory 1305. The processor 1303 may include one or more processing cores with each core configured to perform independently. A multi-core processor enables multiprocessing within a single physical package. Examples of a multi-core processor include two, four, eight, or greater numbers of processing cores. Alternatively or in addition, the processor 1303 may include one or more microprocessors configured in tandem via the bus 1301 to enable independent execution of instructions, pipelining, and multithreading. The processor 1303 may also be accompanied with one or more specialized components to perform certain processing functions and tasks such as one or more digital signal processors (DSP) 1307, or one or more application-specific integrated circuits (ASIC) 1309. A DSP 1307 typically is configured to process real-world signals (e.g., sound) in real time independently of the processor 1303. Similarly, an ASIC 1309 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1303 and accompanying components have connectivity to the memory 1305 via the bus 1301. The memory 1305 includes both dynamic memory (e.g., RAM, magnetic disk, writable optical disk, etc.) and static memory (e.g., ROM, CD-ROM, etc.) for storing executable instructions that when executed perform the inventive steps described herein to provide real-time hierarchical clustering of geographical data. The memory 1305 also stores the data associated with or generated by the execution of the inventive steps.

Figure 14:
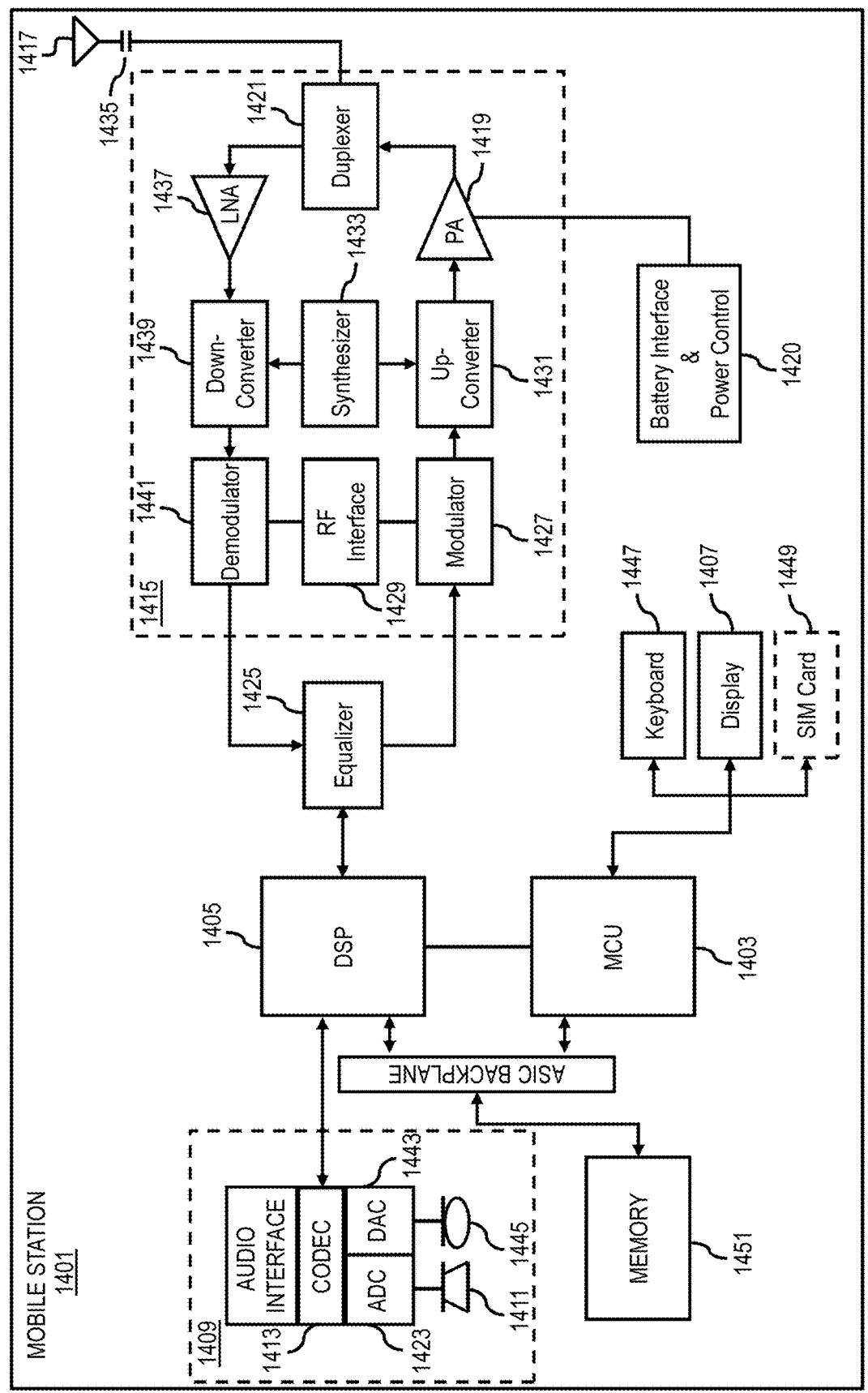
FIG. 14 is a diagram of a mobile terminal (e.g., handset) that can be used to implement an embodiment of the invention.

FIG. 14 is a diagram of exemplary components of a mobile station 1401 (e.g., handset) capable of operating in the system of FIG. 1, according to one embodiment. In one embodiment, the mobile station 1401 is the UE 105, the vehicle 101, and/or parts thereof. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1403, a Digital Signal Processor (DSP) 1405, and a receiver/transmitter unit including a microphone gain control unit and a speaker gain control unit. A main display unit 1407 provides a display to the user in support of various applications and mobile station functions that offer automatic contact matching. An audio function circuitry 1409 includes a microphone 1411 and microphone amplifier that amplifies the speech signal output from the microphone 1411. The amplified speech signal output from the microphone 1411 is fed to a coder/decoder (CODEC) 1413.

A radio section 1415 amplifies power and converts frequency in order to communicate with a base station, which is included in a mobile communication system, via antenna 1417. The power amplifier (PA) 1419 and the transmitter/modulation circuitry are operationally responsive to the MCU 1403, with an output from the PA 1419 coupled to the duplexer 1421 or circulator or antenna switch, as known in the art. The PA 1419 also couples to a battery interface and power control unit 1420.

In use, a user of mobile station 1401 speaks into the microphone 1411 and his or her voice along with any detected background noise is converted into an analog voltage. The analog voltage is then converted into a digital signal through the Analog to Digital Converter (ADC) 1423. The control unit 1403 routes the digital signal into the DSP 1405 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1425 for compensation of any frequency-dependent impairments that occur during transmission though the air such as phase and amplitude distortion. After equalizing the bit stream, the modulator 1427 combines the signal with a RF signal generated in the RF interface 1429. The modulator 1427 generates a sine wave by way of frequency or phase modulation. In order to prepare the signal for transmission, an up-converter 1431 combines the sine wave output from the modulator 1427 with another sine wave generated by a synthesizer 1433 to achieve the desired frequency of transmission. The signal is then sent through a PA 1419 to increase the signal to an appropriate power level. In practical systems, the PA 1419 acts as a variable gain amplifier whose gain is controlled by the DSP 1405 from information received from a network base station. The signal is then filtered within the duplexer 1421 and optionally sent to an antenna coupler 1435 to match impedances to provide maximum power transfer. Finally, the signal is transmitted via antenna 1417 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1401 are received via antenna 1417 and immediately amplified by a low noise amplifier (LNA) 1437. A down-converter 1439 lowers the carrier frequency while the demodulator 1441 strips away the RF leaving only a digital bit stream. The signal then goes through the equalizer 1425 and is processed by the DSP 1405. A Digital to Analog Converter (DAC) 1443 converts the signal and the resulting output is transmitted to the user through the speaker 1445, all under control of a Main Control Unit (MCU) 1403—which can be implemented as a Central Processing Unit (CPU) (not shown).

The MCU 1403 receives various signals including input signals from the keyboard 1447. The keyboard 1447 and/or the MCU 1403 in combination with other user input components (e.g., the microphone 1411) comprise a user interface circuitry for managing user input. The MCU 1403 runs a user interface software to facilitate user control of at least some functions of the mobile station 1401 to provide real-time hierarchical clustering of geographical data. The MCU 1403 also delivers a display command and a switch command to the display 1407 and to the speech output switching controller, respectively. Further, the MCU 1403 exchanges information with the DSP 1405 and can access an optionally incorporated SIM card 1449 and a memory 1451. In addition, the MCU 1403 executes various control functions required of the station. The DSP 1405 may, depending upon the implementation, perform any of a variety of conventional digital processing functions on the voice signals. Additionally, DSP 1405 determines the background noise level of the local environment from the signals detected by microphone 1411 and sets the gain of microphone 1411 to a level selected to compensate for the natural tendency of the user of the mobile station 1401.

The CODEC 1413 includes the ADC 1423 and DAC 1443. The memory 1451 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1451 may be, but not limited to, a single memory, CD, DVD, ROM, RAM, EEPROM, optical storage, or any other non-volatile or non-transitory storage medium capable of storing digital data.

An optionally incorporated SIM card 1449 carries, for instance, important information, such as the cellular phone number, the carrier supplying service, subscription details, and security information. The SIM card 1449 serves primarily to identify the mobile station 1401 on a radio network. The card 1449 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims and as described in the flowcharts of FIGS. 5-8, it is contemplated that these features can be arranged in any combination and order.

What is claimed is:

1. A method for real-time clustering of geographical data in a hierarchical tile projection of mapping data comprising:
   receiving a request to cluster the geographical data by a location of the geographical data within a geographical area, wherein the geographical area is represented by the hierarchical tile projection comprising a plurality of zoom levels, and wherein one or more tiles of each of the plurality of zoom levels represent different respective scales of a corresponding portion of the geographical area;
   determining, by a processor, that the geographical data is located in a border area of a first tile at a higher zoom level of the hierarchical tile projection;
   recursively processing, by the processor, the geographical data located in the border area of the first tile at a higher zoom level to a second tile at a lower zoom level of the hierarchical tile projection for clustering until the geographical data is not located in a border area of the second tile at the lower zoom level; and
   initiating, by the processor, the clustering of the geographical data into a cluster located in the second tile at the lower zoom level.

2. The method of claim 1, further comprising:
   initiating a clustering of the geographical data into an initial cluster at the first tile at the higher level of zoom,
   wherein the processing of the geographical data comprises forwarding the initial cluster including the geographical data.

3. The method of claim 2, further comprising:
   flagging the initial cluster to indicate that subsequently received geographical data that belongs in the initial cluster is to be forwarded to the second tile.

4. The method of claim 1, further comprising:
   determining that the geographical data has expired;
   initiating a removal of the expired geographical data from the initial cluster beginning at the higher zoom level of the hierarchical tile projection; and
   recursively removing the expired geographical data from the cluster at the lower zoom level to which the geographical data was forwarded.

5. The method of claim 1, wherein the clustering is performed using a parallel processing system, and wherein respective computing threads of the parallel processing system are respectively assigned to cluster data for each of the one or more tiles of the hierarchical tile projection in parallel.

6. The method of claim 1, further comprising:
   specifying the border area of the first tile, the border area of the second tile, or a combination thereof based on a predetermined distance from respective boundaries of the first tile, the second tile, or a combination thereof.

7. The method of claim 6, further comprising:
   calculating the predetermined distance based on a clustering distance of the cluster.

8. The method of claim 1, wherein the geographical data relates to one or more location-based events occurring in the geographical area.

9. The method of claim 1, wherein the second tile is a parent tile of the first tile, and wherein the first tile has only one parent tile.

10. A non-transitory computer-readable storage medium for real-time clustering of geographical data in a hierarchical tile projection of mapping data, and carrying one or more sequences of one or more instructions which, when executed by one or more processors, cause an apparatus to perform:
    receiving geographical data at a first computing thread of a parallel processing system, wherein computing threads of the parallel processing system are respectively assigned to cluster data for one or more tiles of the hierarchical tile projection comprising a plurality of zoom levels, and wherein the first computing thread is assigned to a first tile at a higher zoom level of the hierarchical tile projection;
    determining whether the geographical data is located in a border area of the first tile;
    when the geographical data is not located in the border area of the first tile, initiating a clustering of the geographical data into a cluster in the first tile; and
    when the geographical data is located in the border area of the first tile, initiating the clustering of the geographical data into the cluster in the first tile, and initiating a forwarding of the cluster including the geographical data to a second computing thread assigned to a second tile at a lower zoom level to perform another clustering.

11. The non-transitory computer-readable storage medium of claim 10, wherein the apparatus is further caused to perform:
    when the geographical data is located in the border area of the first tile, flagging the cluster in the first tile to indicate that the cluster has been forwarded.

12. The non-transitory computer-readable storage medium of claim 11, wherein the apparatus is further caused to perform:
    receiving subsequent geographical data at the first computing thread;
    determining that the subsequent geographical data is to be clustered in the cluster in the first tile; and
    initiating a forwarding to the subsequent geographical data to the second computing thread when the cluster is flagged.

13. The non-transitory computer-readable storage medium of claim 11, wherein the flagging of the cluster in the first tile comprises adding a value to metadata associated with the cluster to indicate that the cluster has been forwarded.

14. The non-transitory computer-readable storage medium of claim 11, wherein the flagging of the cluster in the first tile is maintained after the geographical data is expired.

15. The non-transitory computer-readable storage medium of claim 10, wherein the geographical data includes one or more incident reports reported by one or more vehicles traversing a transportation network, and wherein the clustering of the geographical data comprises grouping the one or more incident reports into a cluster when the one or more incident reports are determined to be related to a common location-based event.

16. The non-transitory computer-readable storage medium of claim 15, wherein the apparatus is further caused to perform:
    transmitting a notification regarding the common location-based event to one or more devices determined to be within proximity of the common location-based event based on the clustering.

17. The computer-readable storage medium of claim 16, wherein the geographical data includes location data for the one or more devices, wherein the clustering further comprises clustering the one or more devices based on the location data into a device cluster, and wherein the notification is transmitted to the device cluster.

18. An apparatus for real-time clustering of geographical data in a hierarchical tile projection of mapping data comprising:
- at least one processor; and
- at least one memory including computer program code for one or more programs,
- the at least one memory and the computer program code configured to, with the at least one processor, cause the apparatus to perform at least the following,
  - receive a request to cluster the geographical data by a location of the geographical data within a geographical area, wherein the geographical area is represented by the hierarchical tile projection comprising a plurality of zoom levels, and wherein one or more tiles of each of the plurality of zoom levels represent different respective scales of a corresponding portion of the geographical area;
  - determine, by a processor, that the geographical data is located in a border area of a first tile at a higher zoom level of the hierarchical tile projection;
  - recursively process, by the processor, the geographical data located in the border area of the first tile at a higher zoom level to a second tile at a lower zoom level of the hierarchical tile projection for clustering until the geographical data is not located in a border area of the second tile at the lower zoom level; and
  - initiate, by the processor, the clustering of the geographical data into a cluster located in the second tile at the lower zoom level.

19. The apparatus of claim 18, wherein the apparatus is further caused to:
- initiate a clustering of the geographical data into an initial cluster at the first tile at the higher level of zoom,
- wherein the processing of the geographical data comprises forwarding the initial cluster including the geographical data.

20. The apparatus of claim 18, wherein the apparatus is further caused to:
- flag the initial cluster to indicate that subsequently received geographical data that belongs in the initial cluster is to be forwarded to the second tile.

* * * * *